US009148989B2

(12) United States Patent
Van Buskirk et al.

(10) Patent No.: US 9,148,989 B2
(45) Date of Patent: Oct. 6, 2015

(54) ROW TREATING UNIT FOR AGRICULTURE IMPLEMENT

(71) Applicants: L & B Manufacturing, Inc., Brownsdale, MN (US); Yetter Manufacturing Company, Colchester, IL (US)

(72) Inventors: Loyd C. Van Buskirk, Brownsdale, MN (US); Dylan C. Van Buskirk, Brownsdale, MN (US); Derek K. Allensworth, Macomb, IL (US)

(73) Assignee: L & B MANUFACTURING, INC., Brownsdale, MN (US)

( * ) Notice: Subject to any disclaimer, the term of this patent is extended or adjusted under 35 U.S.C. 154(b) by 208 days.

(21) Appl. No.: 13/765,372

(22) Filed: Feb. 12, 2013

(65) Prior Publication Data

US 2014/0224513 A1 Aug. 14, 2014

(51) Int. Cl.
*A01B 63/32* (2006.01)
*A01C 5/06* (2006.01)
*A01B 49/02* (2006.01)
*A01B 49/06* (2006.01)

(52) U.S. Cl.
CPC ............... *A01C 5/066* (2013.01); *A01B 49/027* (2013.01); *A01B 63/32* (2013.01); *A01C 5/068* (2013.01); *A01B 49/06* (2013.01)

(58) Field of Classification Search
CPC .... A01B 49/027; A01B 13/08; A01B 13/025; A01B 35/16; A01B 63/32; A01B 49/06; A01C 5/066; A01C 5/068
USPC .......... 111/140, 200; 172/139, 145, 151, 156, 172/159, 166, 540, 566
See application file for complete search history.

(56) References Cited

U.S. PATENT DOCUMENTS

| 3,175,622 | A | * | 3/1965 | Stam ............................. 172/159 |
| 3,177,828 | A | | 4/1965 | Cramer |
| 3,314,386 | A | | 4/1967 | Kopaska |
| 3,523,585 | A | | 8/1970 | Godbersen |
| 3,528,507 | A | | 9/1970 | Morkoski |
| 3,554,145 | A | | 1/1971 | Hornung et al. |
| 4,227,581 | A | | 10/1980 | Klotzback |
| 4,353,423 | A | | 10/1982 | Poggemiller |
| 4,422,511 | A | | 12/1983 | Poggemiller et al. |
| 4,444,130 | A | | 4/1984 | Ray |

(Continued)

OTHER PUBLICATIONS

Korean Intellectual Property Office, International Searching Authority, International Search Report, Written Opinion of the International Searching Authority with Notice mailed May 16, 2012 in International Application No. PCT/US2011/057076, 9 pages.

(Continued)

*Primary Examiner* — Jamie L McGowan
(74) *Attorney, Agent, or Firm* — Nikolai & Merserau, P.A.; C. G. Mersereau

(57) ABSTRACT

This disclosure is directed to the field of agricultural machinery and relates to implements generally used in combination with a multi-row soil trench closing mechanism. Specifically, the disclosure relates to row treating units adapted to be attached to and following a multi-row planter and incorporating a combination of tools that includes a seed trench closing wheel assembly and a firming/packing wheel assembly. The deployment of and down force exerted by the packing wheel is independently adjustable and controlled using pneumatic air bag operators and the soil penetration of the trench closing wheels is limited.

35 Claims, 20 Drawing Sheets

(56) References Cited

U.S. PATENT DOCUMENTS

| | | | |
|---|---|---|---|
| 4,489,789 A | 12/1984 | Pearce | |
| 4,615,396 A | 10/1986 | Arnold | |
| 4,624,471 A | 11/1986 | Haines et al. | |
| 4,625,132 A | 12/1986 | Moynihan | |
| 4,865,132 A | 9/1989 | Moore, Jr. | |
| 4,878,443 A * | 11/1989 | Gardner | 111/141 |
| 5,052,495 A | 10/1991 | McFarlane et al. | |
| 5,129,282 A * | 7/1992 | Bassett et al. | 74/529 |
| 5,479,992 A | 1/1996 | Bassett | |
| 5,562,054 A | 10/1996 | Ryan | |
| 5,623,997 A * | 4/1997 | Rawson et al. | 172/156 |
| 5,797,460 A | 8/1998 | Parker et al. | |
| 6,068,061 A | 5/2000 | Smith et al. | |
| 6,135,567 A | 10/2000 | Cochran | |
| 6,142,085 A | 11/2000 | Drever et al. | |
| 6,389,999 B1 | 5/2002 | Duello | |
| 6,581,530 B1 | 6/2003 | Hall et al. | |
| 6,681,868 B2 * | 1/2004 | Kovach et al. | 172/701 |
| 6,688,245 B2 | 2/2004 | Juptner | |
| 6,701,857 B1 | 3/2004 | Jensen et al. | |
| 6,761,120 B2 * | 7/2004 | Kovach et al. | 111/140 |
| 6,871,709 B2 * | 3/2005 | Knobloch et al. | 172/145 |
| 6,926,093 B1 | 8/2005 | Fink et al. | |
| 7,156,186 B2 * | 1/2007 | Knobloch et al. | 172/701 |
| 7,240,627 B1 * | 7/2007 | Whalen et al. | 111/140 |
| 7,308,859 B2 | 12/2007 | Wendte et al. | |
| 7,360,494 B2 | 4/2008 | Martin | |
| 7,360,495 B1 | 4/2008 | Martin | |
| 7,395,767 B2 | 7/2008 | Sulman | |
| 7,412,933 B2 * | 8/2008 | Bourgault et al. | 111/156 |
| 7,426,893 B2 | 9/2008 | Wendte et al. | |
| 7,451,712 B2 | 11/2008 | Bassett et al. | |
| 7,472,658 B2 | 1/2009 | Ostlie | |
| 7,574,969 B1 | 8/2009 | Henry et al. | |
| 7,575,066 B2 | 8/2009 | Bauer | |
| 7,578,246 B2 | 8/2009 | Ryder et al. | |
| 7,594,546 B2 | 9/2009 | Ankenman | |
| 7,640,875 B2 | 1/2010 | Forchino | |
| 7,673,570 B1 | 3/2010 | Bassett | |
| 7,861,660 B2 | 1/2011 | Martin | |
| 7,866,410 B2 | 1/2011 | Ryder et al. | |
| 7,921,931 B2 | 4/2011 | Henry et al. | |
| 7,938,074 B2 | 5/2011 | Liu | |
| 7,942,210 B2 * | 5/2011 | Ankenman | 172/540 |
| 7,946,231 B2 | 5/2011 | Martin et al. | |
| 7,975,630 B2 | 7/2011 | Bourgault et al. | |
| 7,980,186 B2 | 7/2011 | Henry | |
| 7,984,768 B2 * | 7/2011 | Schilling | 172/566 |
| 7,992,650 B2 | 8/2011 | Landoll et al. | |
| 7,997,217 B2 | 8/2011 | Stark et al. | |
| 8,028,632 B2 | 10/2011 | Ryder et al. | |
| 8,028,759 B2 | 10/2011 | Ryder et al. | |
| 8,042,620 B2 | 10/2011 | Henry | |
| 8,047,147 B2 | 11/2011 | Harnetiaux | |
| 8,069,798 B2 | 12/2011 | Martin | |
| 8,100,192 B2 | 1/2012 | Henry et al. | |
| 8,100,193 B2 | 1/2012 | Henry et al. | |
| 8,448,587 B2 * | 5/2013 | Kowalchuk | 111/200 |
| 8,522,889 B2 * | 9/2013 | Adams et al. | 172/4 |
| 2003/0024450 A1 | 2/2003 | Juptner | |
| 2003/0226670 A1 | 12/2003 | Knobloch et al. | |
| 2004/0226727 A1 * | 11/2004 | Weast et al. | 172/684.5 |
| 2005/0263050 A1 | 12/2005 | Bassett et al. | |
| 2008/0302283 A1 | 12/2008 | Martin | |
| 2008/0314301 A1 | 12/2008 | Whalen et al. | |
| 2009/0107370 A1 | 4/2009 | Ostlie | |
| 2010/0006309 A1 | 1/2010 | Ankenman | |
| 2010/0006310 A1 * | 1/2010 | Bauer | 172/166 |
| 2010/0275827 A1 | 11/2010 | Van Buskirk et al. | |
| 2010/0300710 A1 | 12/2010 | Bassett | |
| 2011/0000410 A1 | 1/2011 | Manasseri et al. | |
| 2011/0067613 A1 | 3/2011 | Martin | |
| 2011/0179983 A1 | 7/2011 | Ryder et al. | |
| 2011/0231069 A1 | 9/2011 | Ryder et al. | |
| 2011/0232550 A1 | 9/2011 | Van Buskirk et al. | |
| 2011/0239920 A1 | 10/2011 | Henry | |
| 2011/0247537 A1 | 10/2011 | Freed | |
| 2011/0247843 A1 | 10/2011 | Whalen et al. | |
| 2011/0284252 A1 | 11/2011 | Friggstad et al. | |
| 2011/0303137 A1 | 12/2011 | Tevs et al. | |
| 2011/0308826 A1 | 12/2011 | Ryder et al. | |
| 2012/0006240 A1 | 1/2012 | Henry | |
| 2012/0012042 A1 | 1/2012 | Castagno Manasseri et al. | |
| 2012/0012349 A1 | 1/2012 | Van Buskirk et al. | |
| 2012/0017813 A1 | 1/2012 | Van Buskirk et al. | |
| 2012/0042811 A1 | 2/2012 | Harnetiaux | |
| 2012/0042814 A1 | 2/2012 | Harnetiaux | |
| 2012/0048159 A1 | 3/2012 | Adams et al. | |
| 2012/0060730 A1 | 3/2012 | Bassett | |
| 2012/0060731 A1 | 3/2012 | Bassett | |
| 2012/0151910 A1 | 6/2012 | Sauder et al. | |
| 2012/0255475 A1 | 10/2012 | Mariman et al. | |
| 2013/0206431 A1 * | 8/2013 | Freed | 172/1 |

OTHER PUBLICATIONS

International Preliminary Report, dated Jan. 3, 2014.

\* cited by examiner

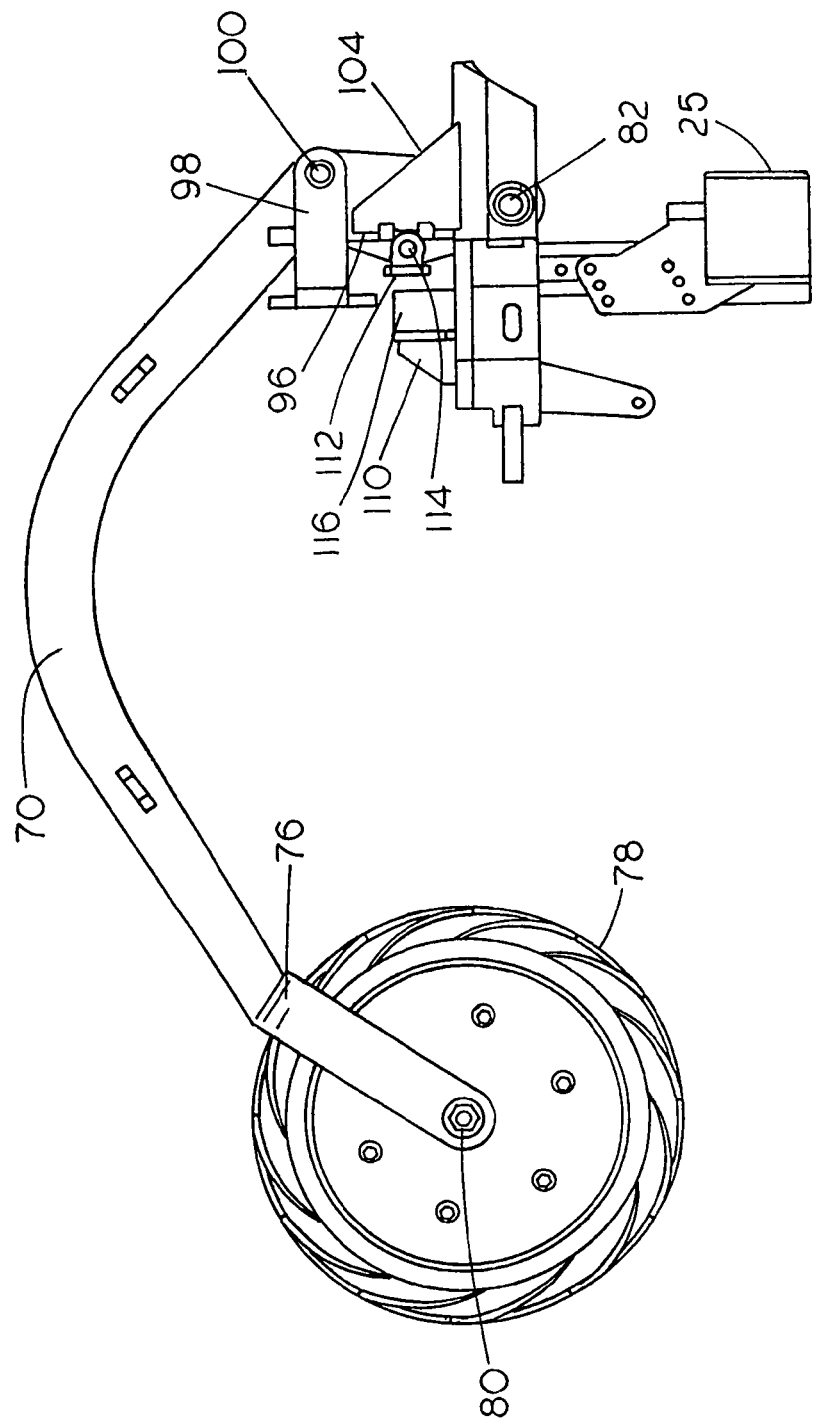

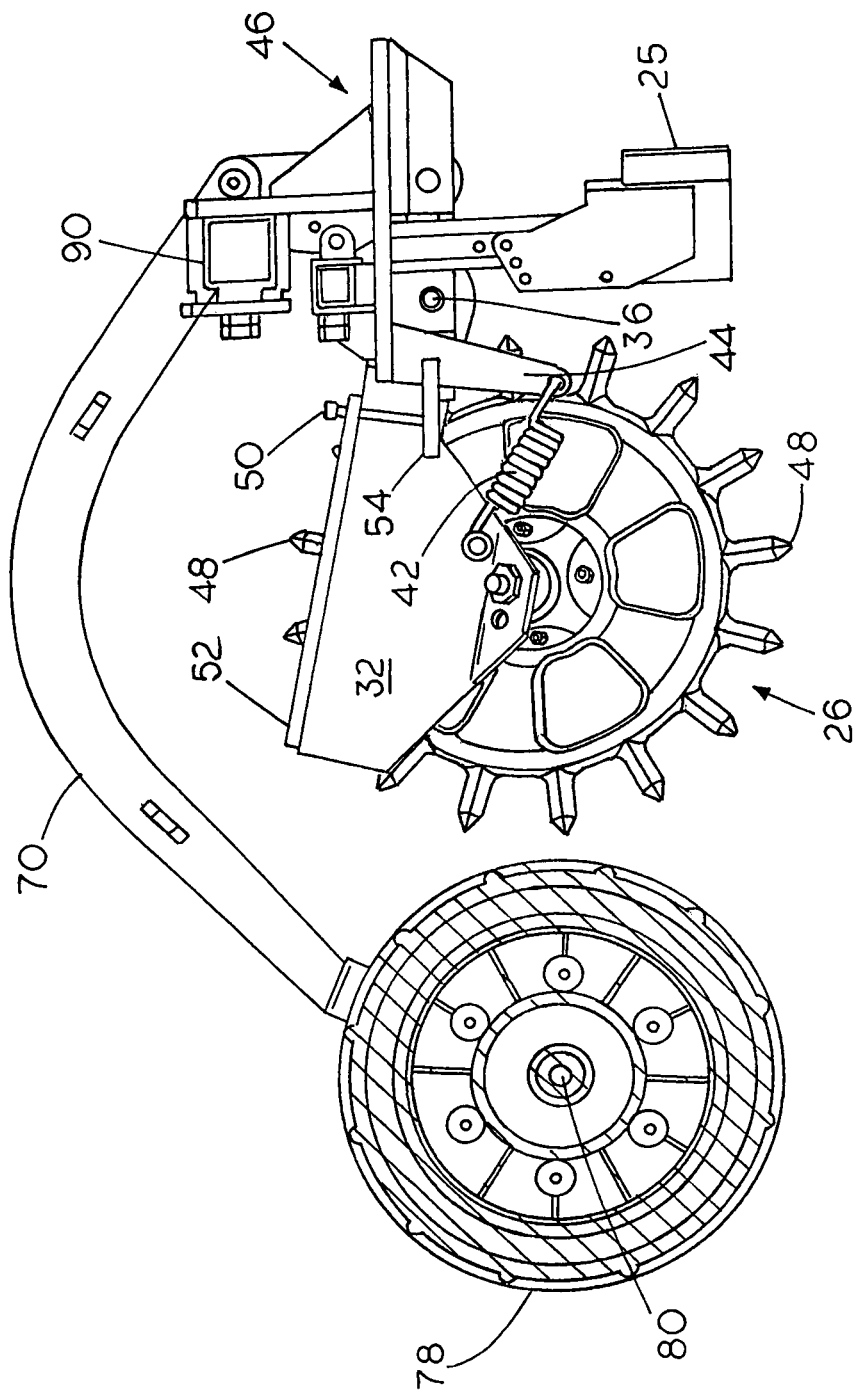

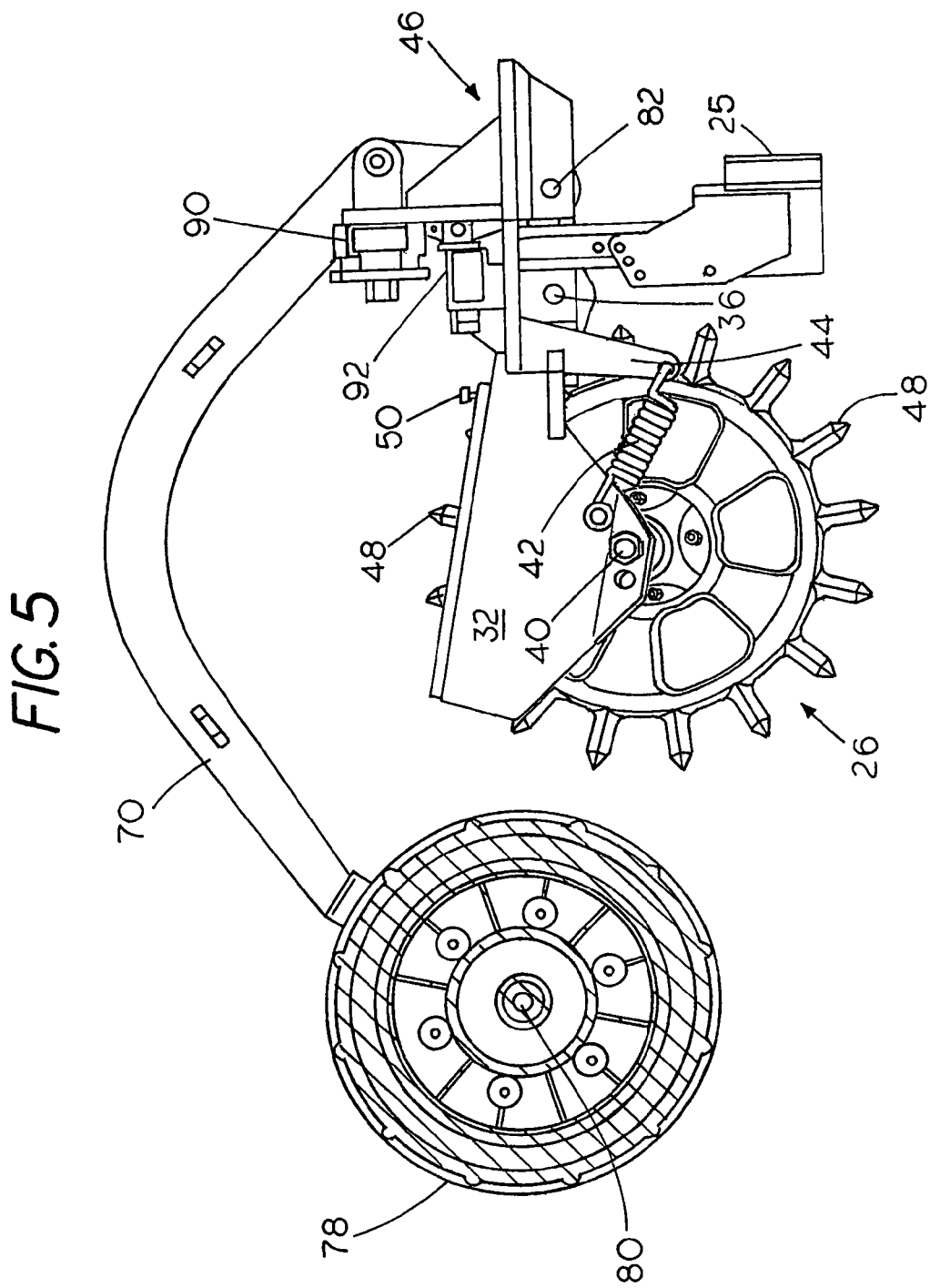

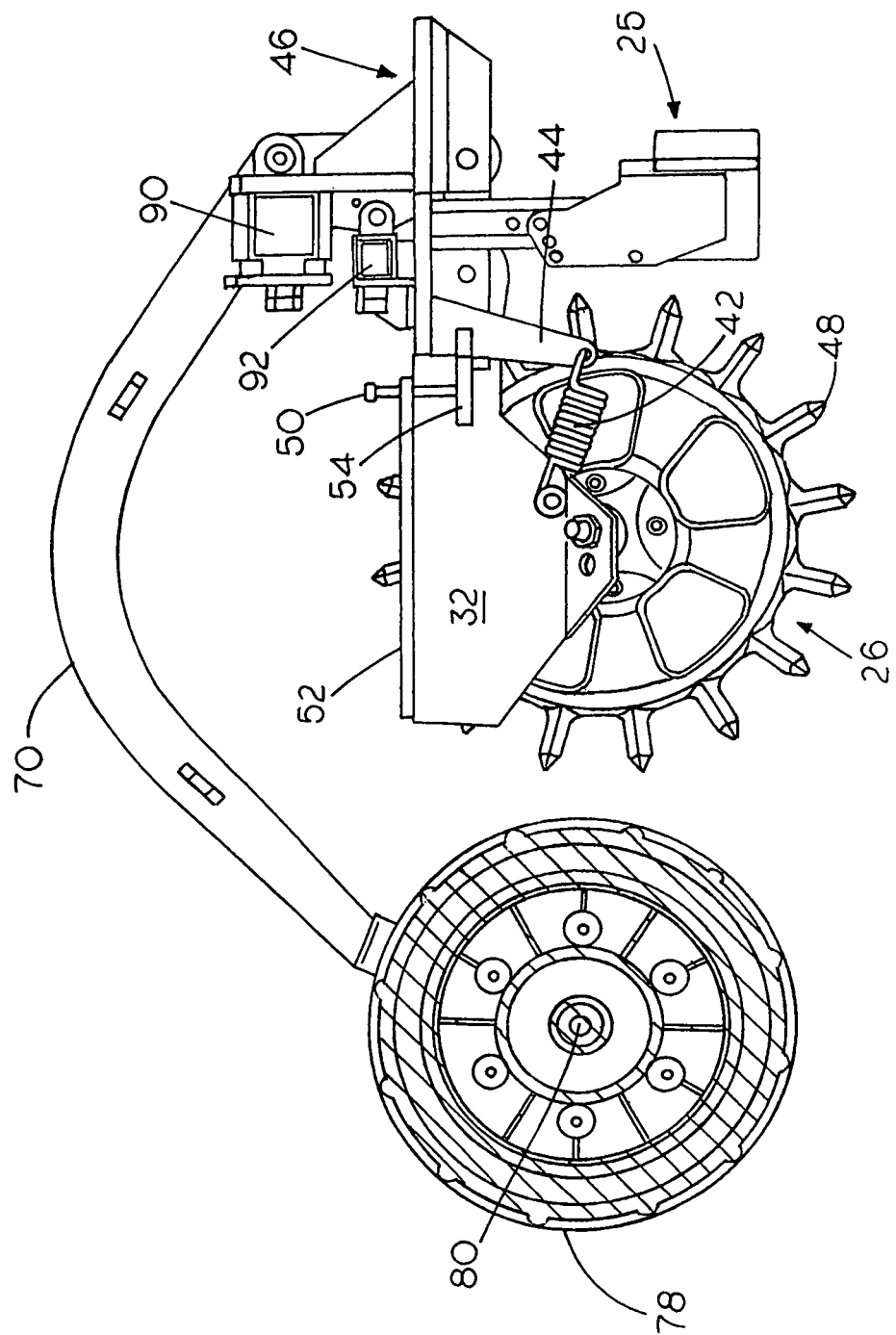

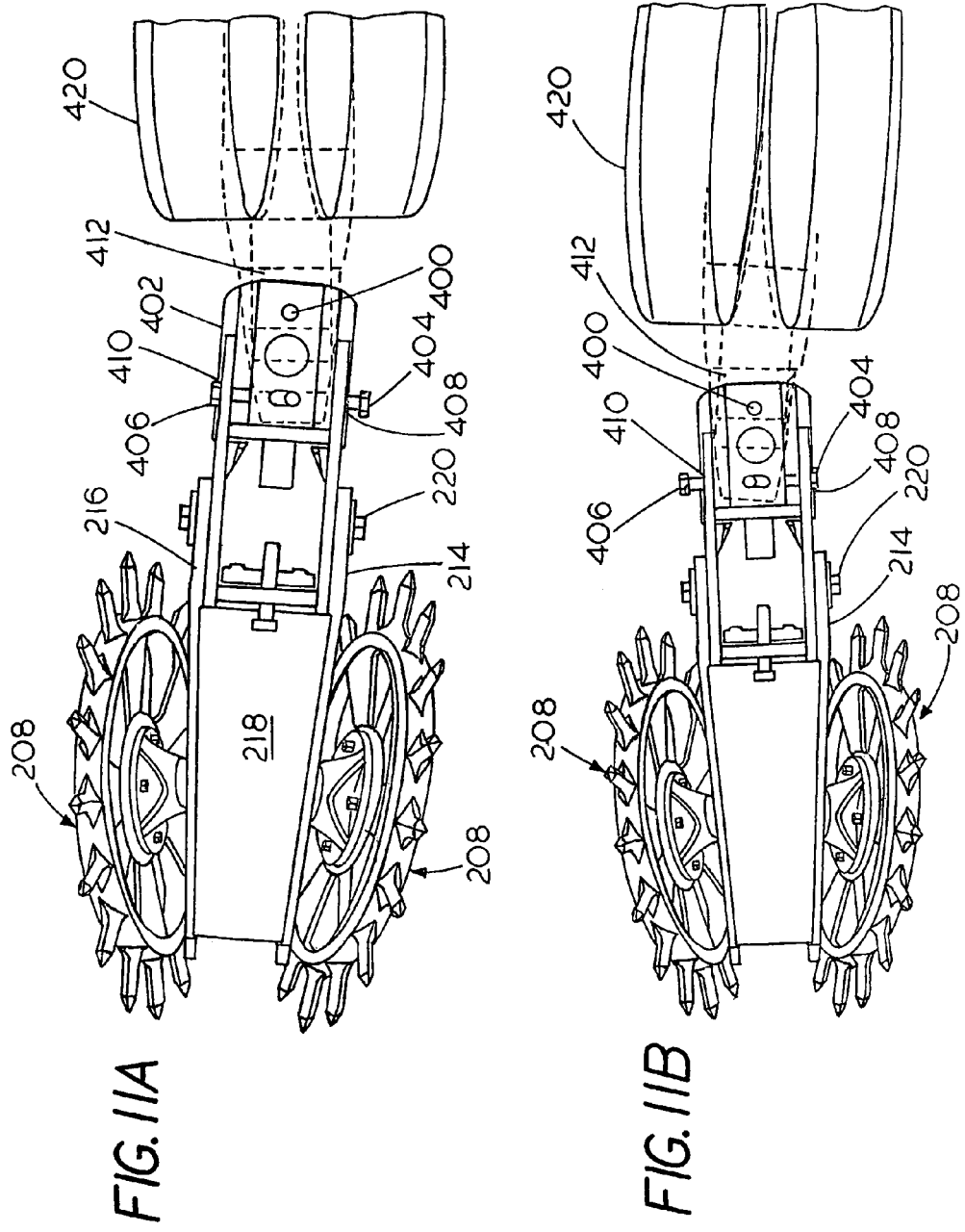

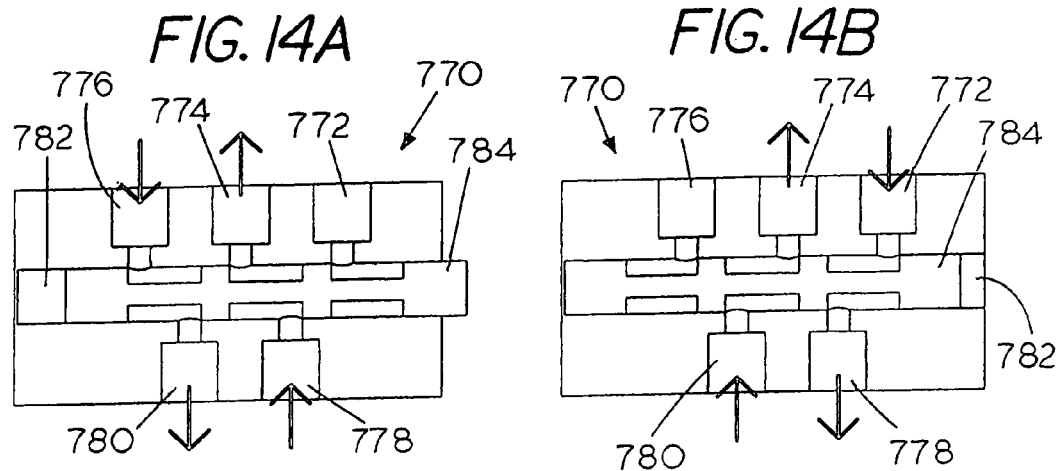
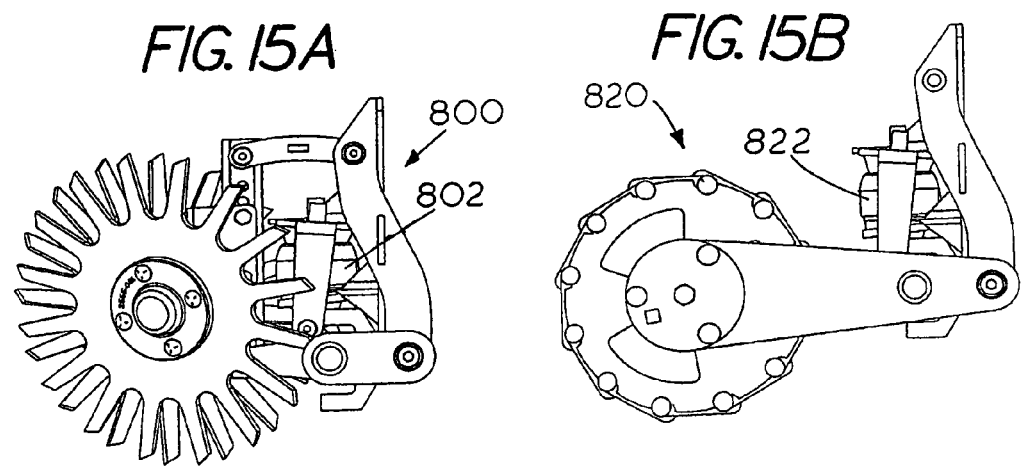
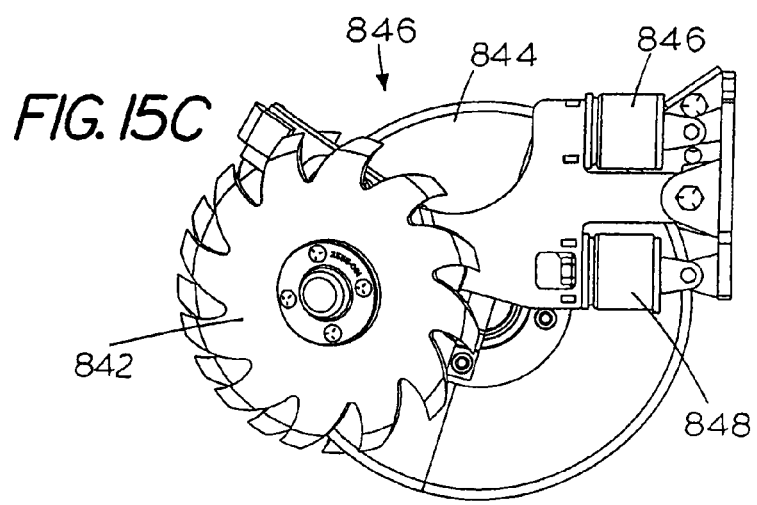

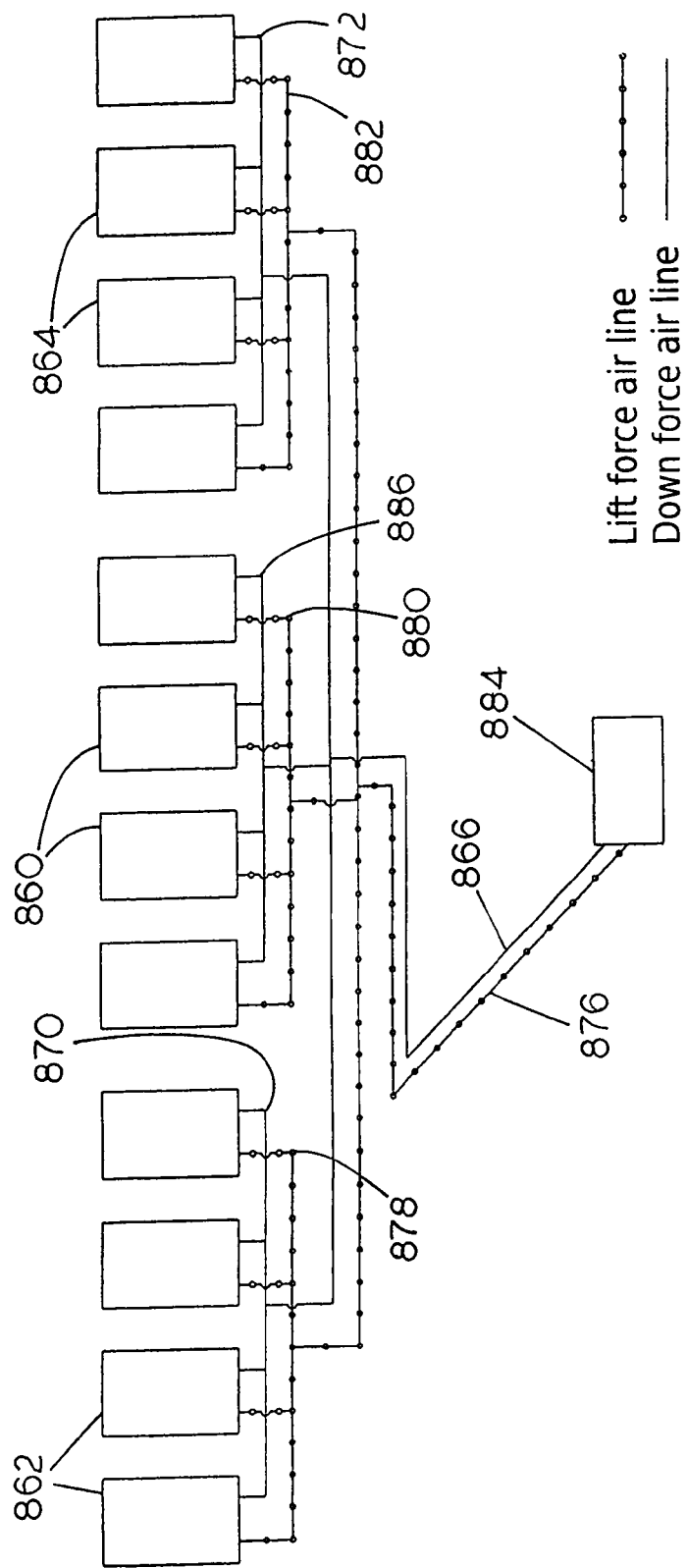

ROW TREATING UNIT FOR AGRICULTURE IMPLEMENT

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

This invention is directed generally to the field of agriculture machinery, and more particularly, it relates to implements associated with soil trench closing mechanisms adjusted with controllers. Associated implements include seed planting devices, fertilizer applicators, tillage closers, irrigation drip line equipment, and related products. Specifically, the invention relates to row treating units incorporating a combination of tools in the form of closing devices and soil packing devices, also known as closing wheels and soil firming/packing wheels. The units are designed to be attached to the rear of seed planting implements or other ground engaging equipment. The deployment of and/or down force exerted by the closing wheels and packing wheels are independently adjustable and use pneumatic operators for controlling up and down adjustments.

II. Related Art

In the spring or fall, prior to planting, farmers must prepare their fields for accepting seed. Many tillage implements have been designed and are used to condition the soil in preparation for planting. Traditional farming includes both primary and secondary tillage tasks to prepare the soil such as plowing, disking, field cultivating and harrowing. Disking is an example of a method of primary tillage and harrowing is an example of a method of secondary tillage.

Primary tillage is an optional first pass over the soil using a soil conditioning implement attached to the rear of a tractor which works deep into the soil. The soil is usually worked several inches deep to break up clods of soil, remove air pockets, and destroy weeds deep in the earth.

Secondary tillage involves another pass over the same soil, at a more shallow depth, using implements which are generally attached to the rear of the primary tillage unit or to the front of a planter such that the secondary tillage unit follows the primary tillage unit. The secondary tillage unit generally may work the soil to a depth of a few inches or more, but usually not to exceed the desired seed planting depth. More recently, secondary tillage may be the only soil conditioning that takes prior to planting.

A secondary tillage unit is usually a final conditioning tool to prepare the soil for planting. Thus, rotating blade coulter units may be used to chop up crop residues and loosen the soil; and row cleaners, which include a pair of converging multi-bladed trash wheels, used to move the crop residue out of the way to provide a cleared area for rows to be planted. Rolling baskets also may be used to break up soil clods and break up any crust on the top of the soil prior to planting.

After the soil has been prepared and crop residue moved out of the way, the planting/seeding operation takes place. Seeding devices are multi-row devices pulled by tractors and include opening disks that create an open seed trench that allows for seed to be dropped into soil at a metered rate and set depth. Thereafter, the trenches made by the opening disks must be closed with the proper amount of pressure and the soil firmed/packed. This is preferably done using, in combination, pairs of closing wheels followed by firming/packing wheels which are mounted on a row unit or tool bar. A combination of these implements is associated with each row unit on the seeding equipment.

Closing wheels are usually mounted in pairs that are angled to converge rearward of the seeding equipment. The closing wheels are designed to crush and crumble trench walls from both sides. They may take any of several forms including round rubber wheels, or wheels with radially distributed spikes. The sets of closing wheels are mounted on assemblies that include springs that apply downward force to pivot the closing wheel mounts and force the closing wheels to the ground. The downward force may be adjusted by adjusting the tension in the spring. A problem with prior closing wheel assemblies is that in some instances the force will cause the closing wheels to penetrate to a depth that interferes with the seeds planted at the bottom of the trench and cause problems with seed spacing and depth. This may even lead to some seeds being thrown from the seed trench or uneven emergence.

Mounting systems for firming/packing wheels are typically provided with a down force spring arrangement, but have no ability to lift the packing wheel or reduce pressure desired. The packing wheels are designed to follow the closing wheels to firm/pack the soil over the seeds. This must be accomplished with a proper amount of pressure to be successful. Thus, too little pressure results in voids or air pockets in the soil, and too much pressure will compact the soil too tightly making it difficult for the plants to sprout through the hard packed soil, and roots will be obstructed by the seed trench compaction all season and will not penetrate the ground as easily as desired. Too little compaction will allow soil to dry out too soon.

It would present a desirable advantage if the depth and amount of pressure exerted by the closing mechanisms could be more closely and conveniently controlled.

SUMMARY OF THE INVENTION

By means of the present invention there is provided a row implement treating unit that combines a soil trench closing assembly and a firming/packing wheel assembly for attachment to a multi-row implement. Certain embodiments may include the trench closing assembly without the firming/packing wheel. Embodiments of the unit generally include a soil trench closing assembly and is provided with a pair of height adjustable closing wheels and a closing wheel mounting arrangement that operates the closing wheels and a downforce device for applying a down force to the closing wheels to force them to penetrate the soil. Optionally, a single wheel system can be used. This is used in combination with an adjustable depth limiting or positive stop device to control or limit lowest height adjustment and thereby limit the degree of soil penetration to a desired setting or to raise the lower limit of the closing wheels to a height above the ground. Alternatively, the trench closing assembly may be an active actuator system that includes a device to raise the closing wheels.

In most preferred embodiments, the unit also includes a firming/packing wheel assembly which includes a packing wheel and a packing wheel mounting and actuating arrangement for deploying and lifting the packing wheel which has a pivotally-mounted framework preferably operated by a pneumatic control system which includes down-force and lift pneumatic devices. A down-force only embodiment is also shown.

In one arrangement, the pneumatic control system for the firming/packing wheel includes a single down-force airbag and a pair of smaller lift airbags. In an alternate embodiment, the system includes aligned, opposed down-force and lift airbags located between fixed plate members with a traveling intermediate plate member therebetween which operates the pivotally-mounted framework arrangement for the packing wheel mounting framework. The pneumatic control operating system for the packing wheel further includes mechanical down-force and lift stop devices to limit down-force and lift travel of the packer wheel.

The system may also include a debris deflector mounted ahead of the closing wheels and the unit may be provided with a follower angle adjustment arrangement for adjusting the follower angle between the row unit and any main unit to which it is attached.

Operation and adjustment of the pneumatic devices of the row units may be controlled from the cab of a prime mover, normally, a tractor, which is attached to pull an associated seeding device or other tow bar arrangement to which one or more of the row units is attached. In addition, sensors may be provided that provide information that can be used to automatically control aspects of the operation.

BRIEF DESCRIPTION OF THE DRAWINGS

In the drawings wherein like reference characters denote like parts:

FIGS. 3C and 3D are fragmentary views with parts removed for clarity that illustrate mechanical lift and down stops for the pivoting arm mount arrangement for raising and lowering the packing wheel of the embodiment of FIG. 1;

FIG. 4 is a side partial sectional view of through the embodiment of FIG. 1 showing the mechanism with the packing wheel fully deployed and the closing wheels raised;

FIG. 5 is a view similar to FIG. 4 with the packing wheel also raised;

FIG. 6 is a sectional view similar to FIG. 4 with both the closing wheels and the packing wheel deployed in a down position;

FIGS. 11A and 11B illustrate the use of left and right adjustment bolts to adjust the angle of the row unit, including the packer wheel, left and right of dead center;

FIGS. 14A and 14B depict a typical 2-position plunger-operated five-port valve associated with the operation of pneumatic operators in accordance with the invention shown in alternate position;

FIGS. 15A, 15B and 15C show additional implements used prior to planting that may be pneumatically operated;

FIG. 16 is a schematic representation of a multi-row pneumatic system for operating a plurality of spaced row treating units that may be attached to a tow bar or multi-row seed planting implement;

DETAILED DESCRIPTION

Figure 1:
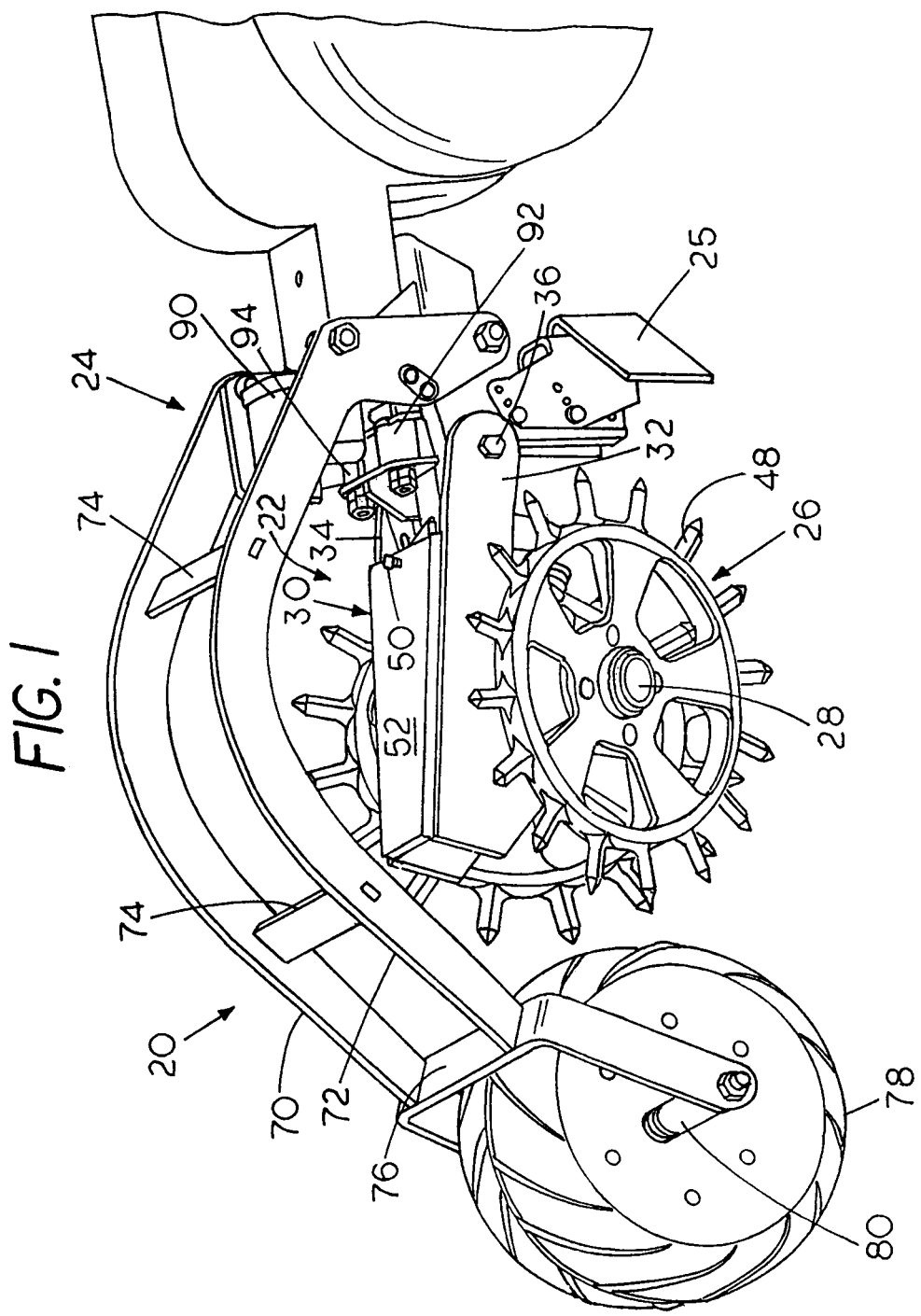
FIG. 1 is a perspective view of one row treating unit embodiment that includes a combination of spiked closing wheels and a packing wheel in accordance with the invention.

The detailed description of the illustrative embodiments is intended to illustrate representative examples of the inventive concepts and is not intended to limit the scope of those concepts. The examples are to be read in connection with the accompanying drawings, which are to be considered part of the entire written description of this invention. In the description, relative terms such as "lower", "upper", "horizontal", "vertical", "above", "below", "up", "down", "top" and "bottom", "left" and "right" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise. As used herein, the term "trench closing mechanism" is meant to include any configuration of wheeled seed, fertilizer, tillage, etc., trench closing device and may be used interchangeably with trench closing wheels. The terms "firming wheel", "firming/packing wheel" and "packing wheel" are also used interchangeably for such wheel devices used in conjunction with closing systems.

The term "airbag" as used herein is defined to mean any type of inflatable pneumatic operator, without limitation, including convoluted and non-convoluted devices with single and multiple air access ports, and ports at different locations.

FIG. 1 illustrates a row treating unit generally at 20 that includes a trench closing mechanism assembly 22 and a firming/packing wheel assembly 24. An optional debris deflecting attachment 25 is mounted ahead of the trench closing wheels to deflect rocks and other field debris that otherwise might damage the closing wheels or cause them to skid because rock or debris becomes lodged between the closing wheels.

The trench closing wheel assembly includes a pair of converging spiked closing wheels 26 mounted on stub axles as at 28 which is carried by a heavy structural frame 30 which includes spaced heavy flanking shaped side plate members 32 and 34, each of which is designed to pivot about a fulcrum pivot joint as at 36 as the closing wheel mounting assembly moves up and down.

As best seen in FIGS. 4 and 5, side plate members 32 and 34 are connected to a shaft 40 that extends between the side plate members and carries one end of a tension spring 42 which is also connected to lever member 44 that is fixed to an independent fixed support structure arrangement 46 so that the tension spring 42 tends to pivot the trench closing assembly downward forcing the spikes 48 of the closing wheels 26 into the ground. The maximum depth of soil penetration of the closing wheels is limited by a stop system that includes an adjustable set screw 50 that is threaded through a top plate 52 of the trench closing wheel assembly and contacts a fixed gusset member 54 to thereby adjustably limit the downward travel of the wheel mounting assembly. As pictured in FIGS. 4 and 5, the set screw 50 is almost fully extended toward the gusset member 54 and the closing wheels 26 are therefore in a raised position. In FIG. 6, the set screw is backed off, thereby permitting the spiked wheels 26 to enter the soil, a controlled or limited amount.

Figure 2:
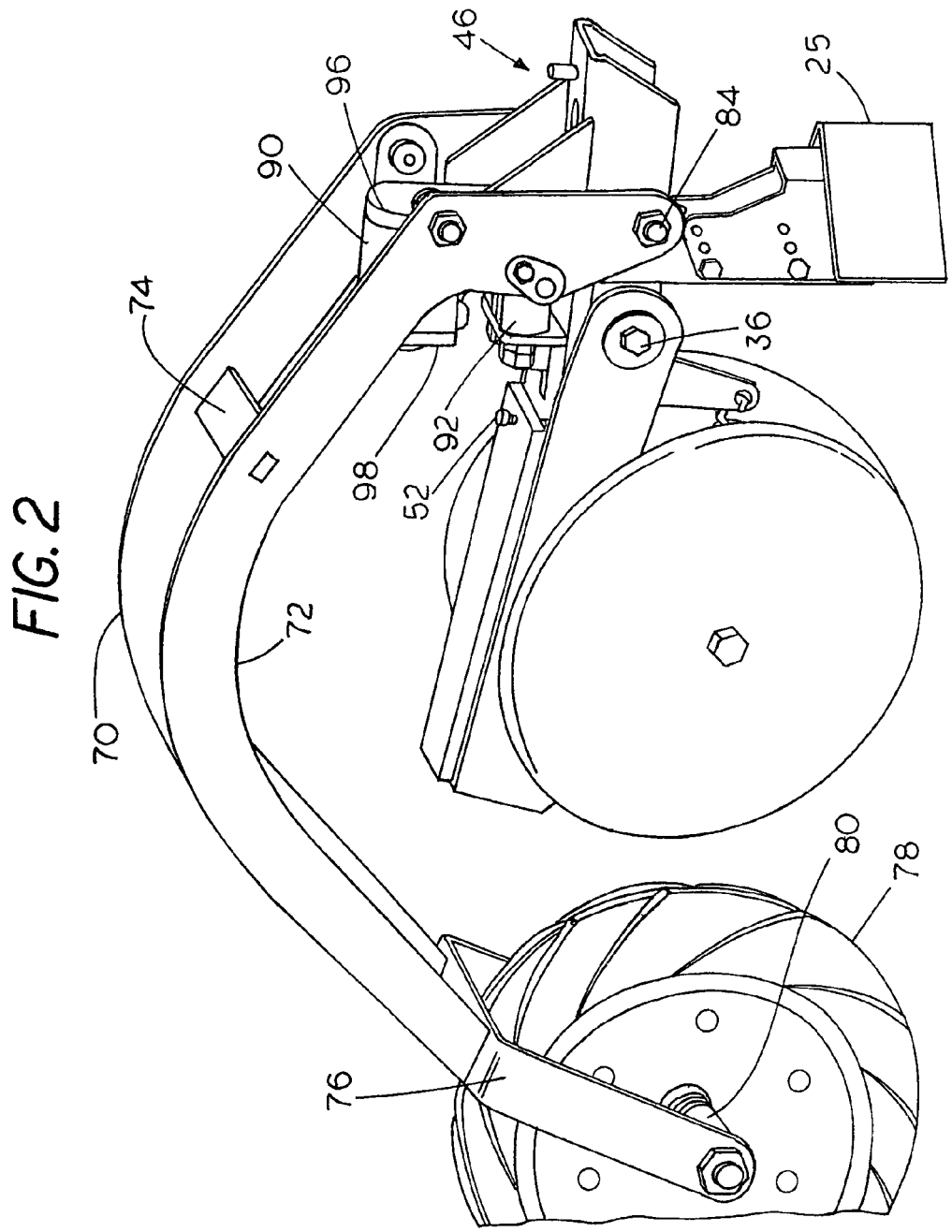
FIG. 2 is a perspective view of the embodiment of FIG. 1 with smooth closing wheels.

It is important for the closing wheels to be mounted on a resilient system that enables them to raise up to prevent damage if obstacles are encountered. The spring biased mounting enables the closing wheels to rise out of the way when they encounter something hard in the soil such as a rock. The optional adjustable stop system enables the maximum depth of the closing wheels to be adjusted as necessary to accommodate seed trenches of varying depths. The maximum depth penetrated by the closing wheels needs to be shallower that the depth of the planted seeds to avoid interference with the seeds. The closing wheels are designed to crush and crumble the seed trench walls without disturbing the planted seeds. Several different kinds of wheels are used and FIG. 2 shows the use of smooth edge wheels rather than spiked wheels. An important aspect of the present system is the adjustability of the maximum depth of the closing wheels. The set screw position can be adjusted as often as desired. Also, other devices can be used to apply the down force to and limit penetration of the closing wheels.

The packing wheel assembly 20 has a pivoting framework that includes a pair of rather long spaced, generally arcuate, shaped support arm members 70 and 72 connected together by spaced cross members 74 and connected at their free ends to a yoke 76 which carries the packing wheel 78 on a shaft or axle 80. The support arm members with bushings 82 are pivotally mounted on a bolt shaft 84 in structural shape 86 that extends through fixed support structure 46. The packing wheel assembly is operated by a pneumatic system that includes airbags. This embodiment includes three airbags, a single down-force airbag 90 and a pair of smaller spaced lift airbags 92 and 94. As best seen in FIGS. 3C and 3D, the down-force airbag 90 operates between a fixed plate 96 attached to the support structure and a bent flange member 98 that is pivotally fixed to the spaced support arms 70 and 72 at pivot points 100 and 102, respectively. Reinforcing gusset members are shown at 104 and 106. The lift airbags 92 and 94 operate between fixed plates 108 reinforced by gusset member 110 and a lift pedestal member 112 which, in turn, is carried on a lift pin 114, which is journaled in support arm members 70 and 72.

Figure 3A:
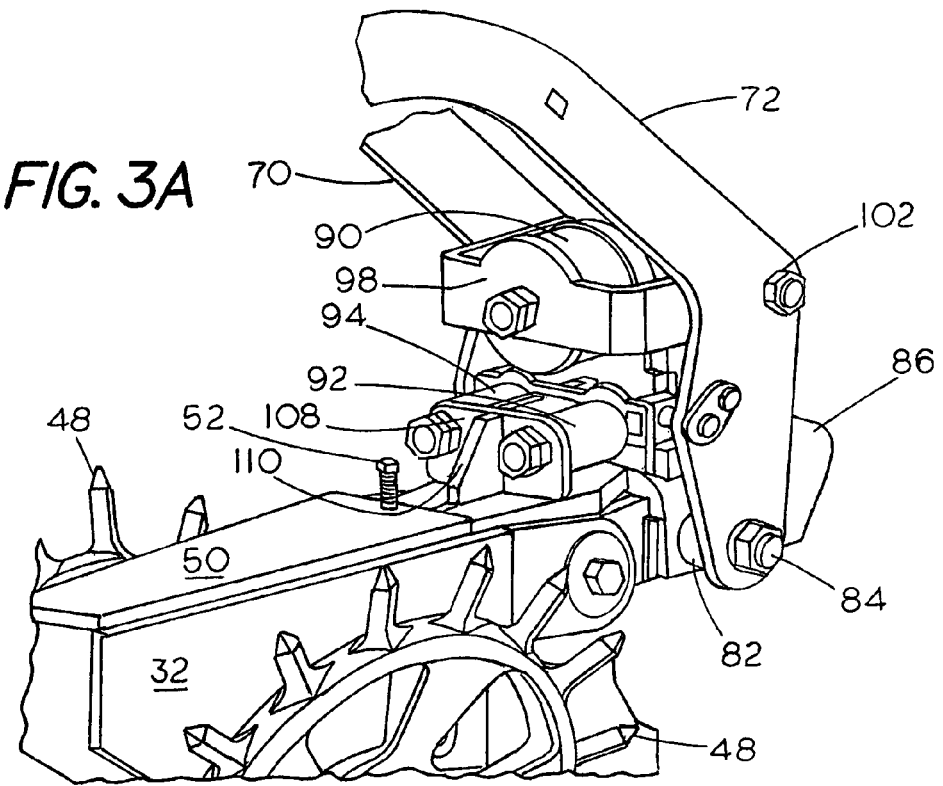
FIGS. 3A and 3B are fragmentary perspective views of the embodiment of FIG. 1 further illustrating the operating systems.
Figure 3B:
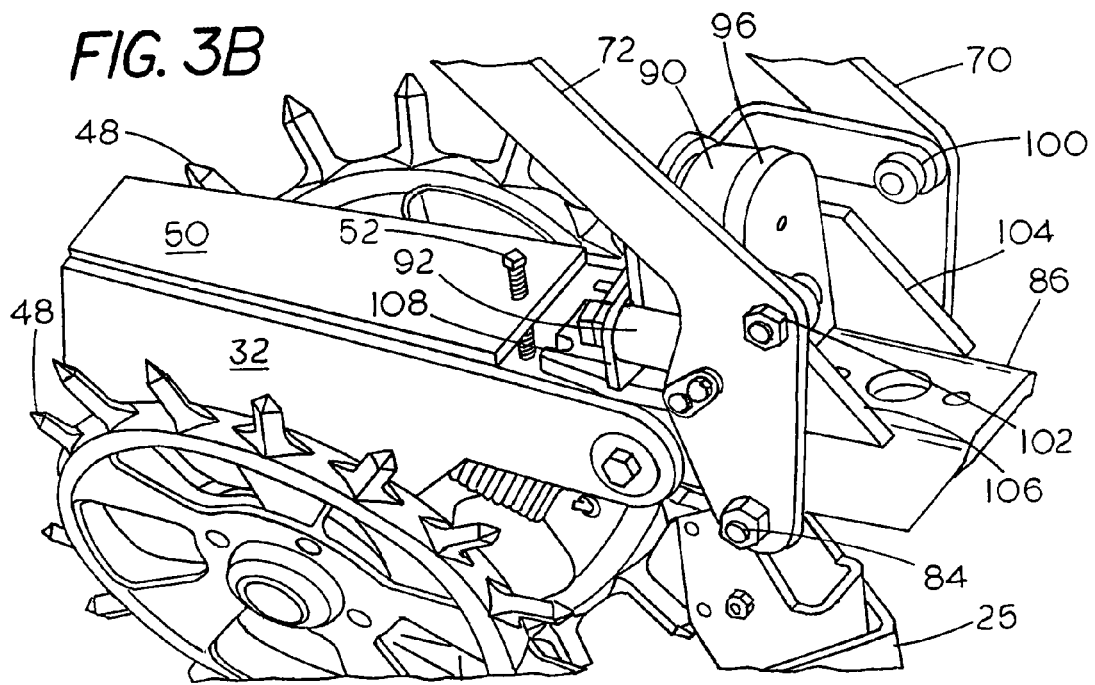
Figure 3D:
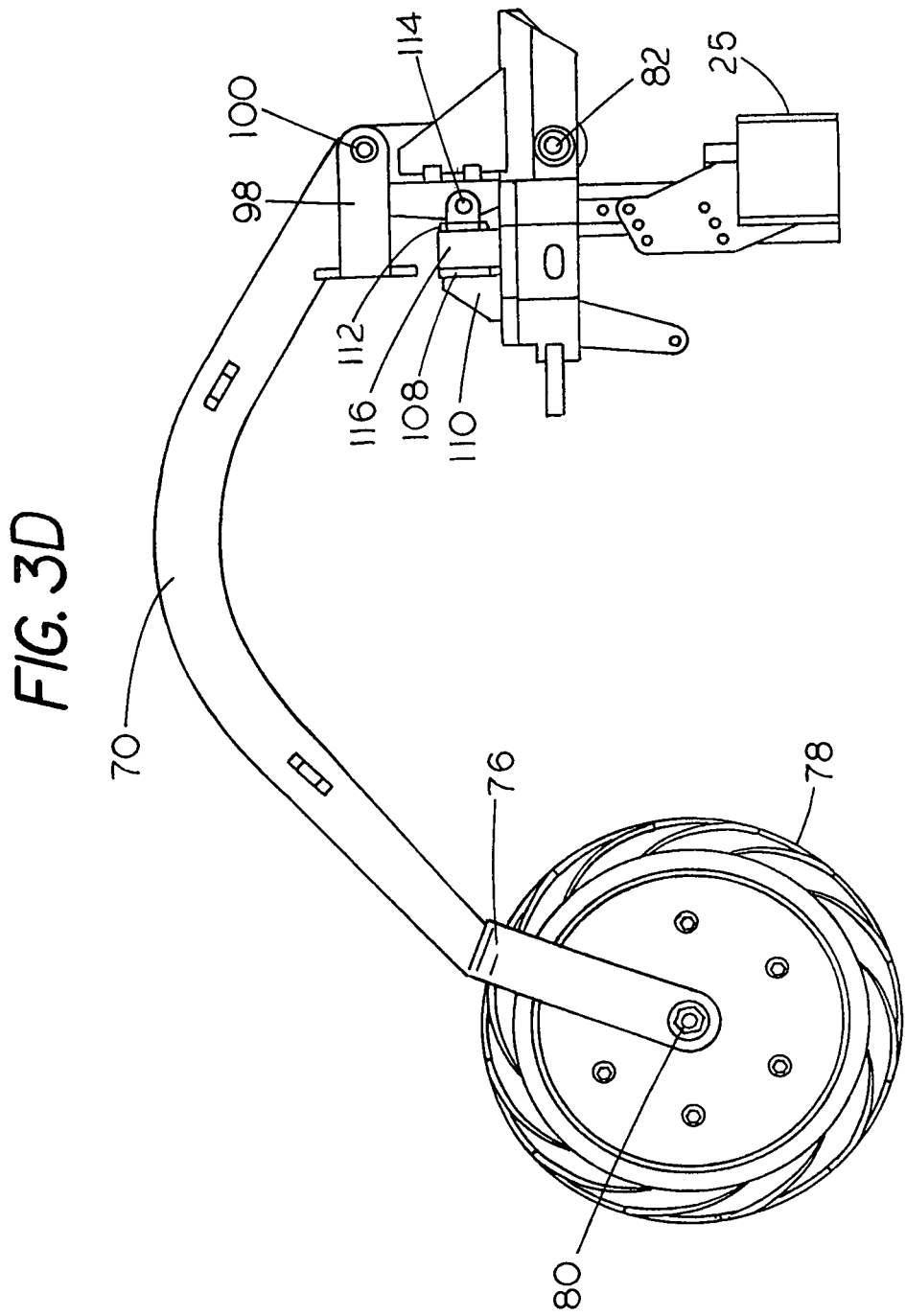
Figure 7A:
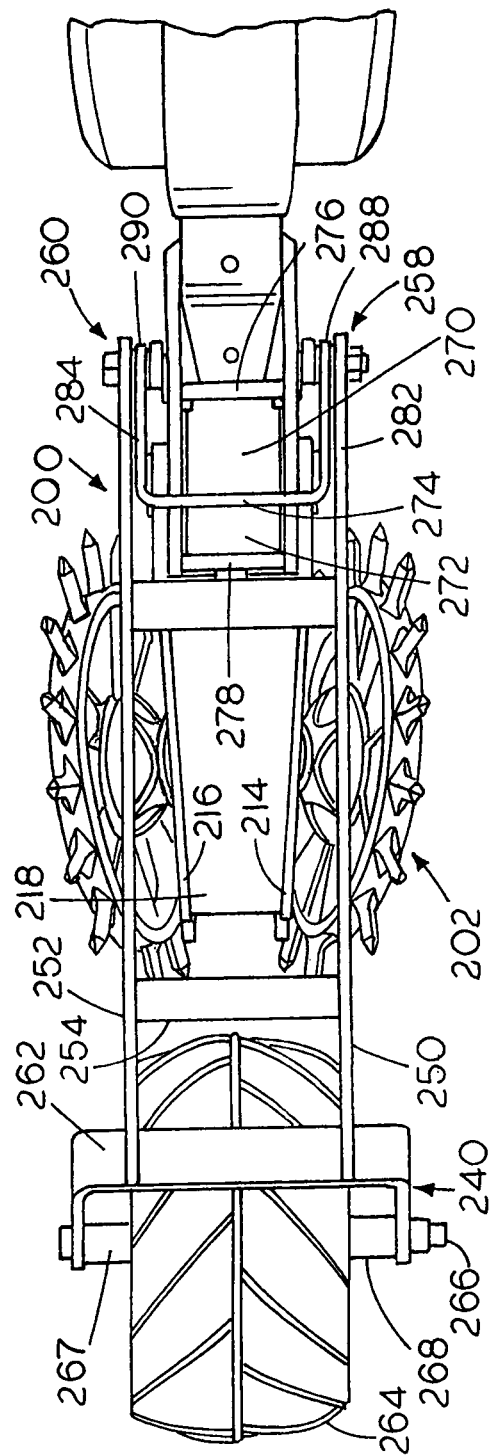
FIGS. 7A and 7B are top and side elevation views of an alternate embodiment of a row unit in accordance with the invention.
Figure 7B:
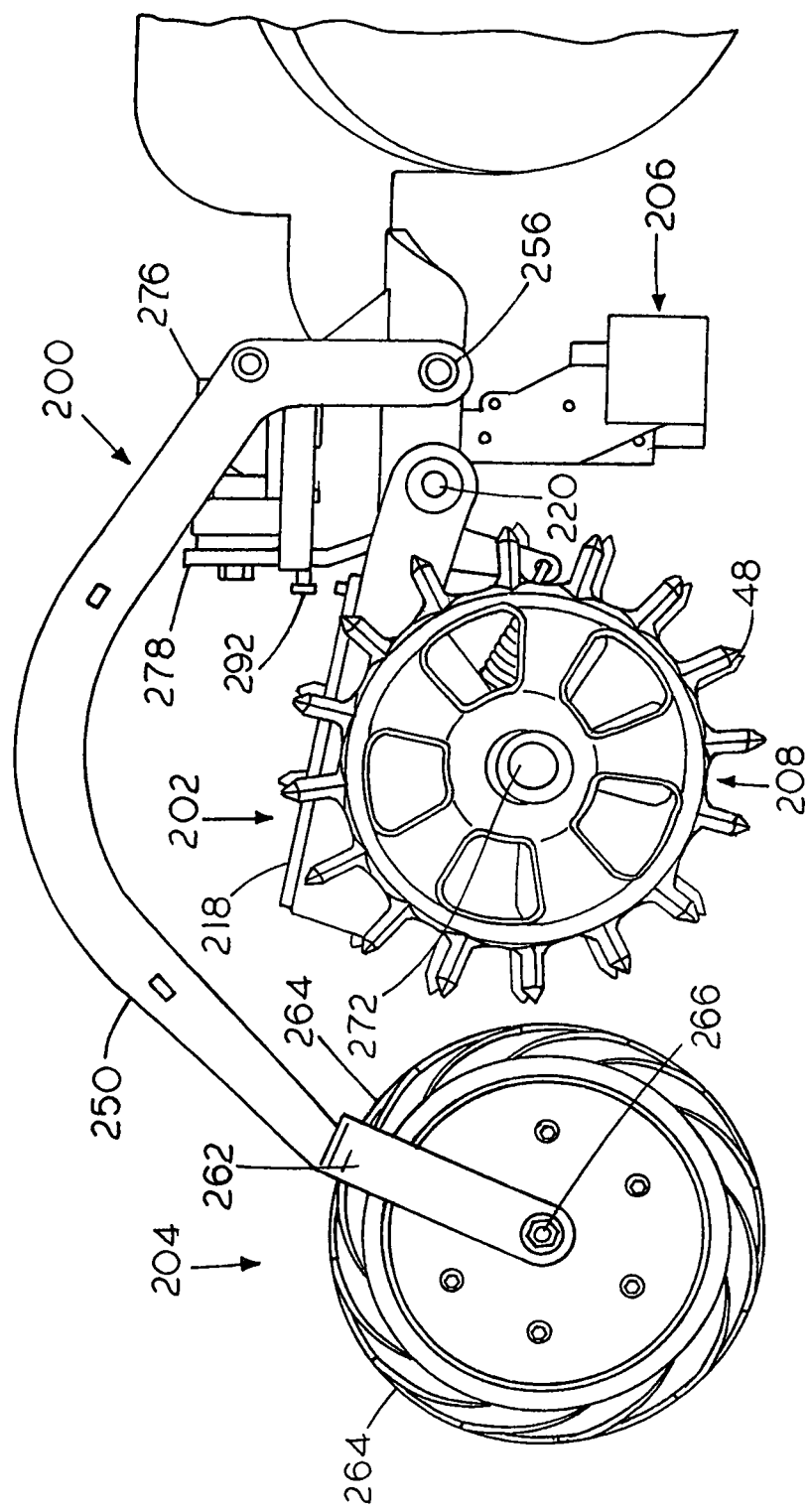

In operation, as best seen in FIGS. 3A-3D, when the packing wheel is raised, the down-force airbag is vented and the lift pedestal member is displaced forward as the lift airbags extend. A lift stop is reached when the lift pin 114 contacts the fixed plate member 96 (FIG. 3C). Conversely, when the packing wheel is deployed in the ground-engaging position, the down-force airbag inflates and the lift airbags are vented and deflate. A downward limit stop is provided when the lift pedestal member is displaced rearward by the lift pin 114. As the support arm members are lowered, contacts a down stop plate 116, which also determines the minimum length of the lift airbags (FIG. 3D). Of course, pressure can also be supplied to both lift and down-force airbags in any desired combination to provide any desirable controlled down force to the packing wheel to adjust to any soil condition.

An alternate embodiment of the row unit of the invention is shown in FIGS. 7A through 11B. The row unit, generally 200, includes a seed trench closing wheel assembly 202, packer wheel assembly 204 and debris deflector 206.

Figure 8:
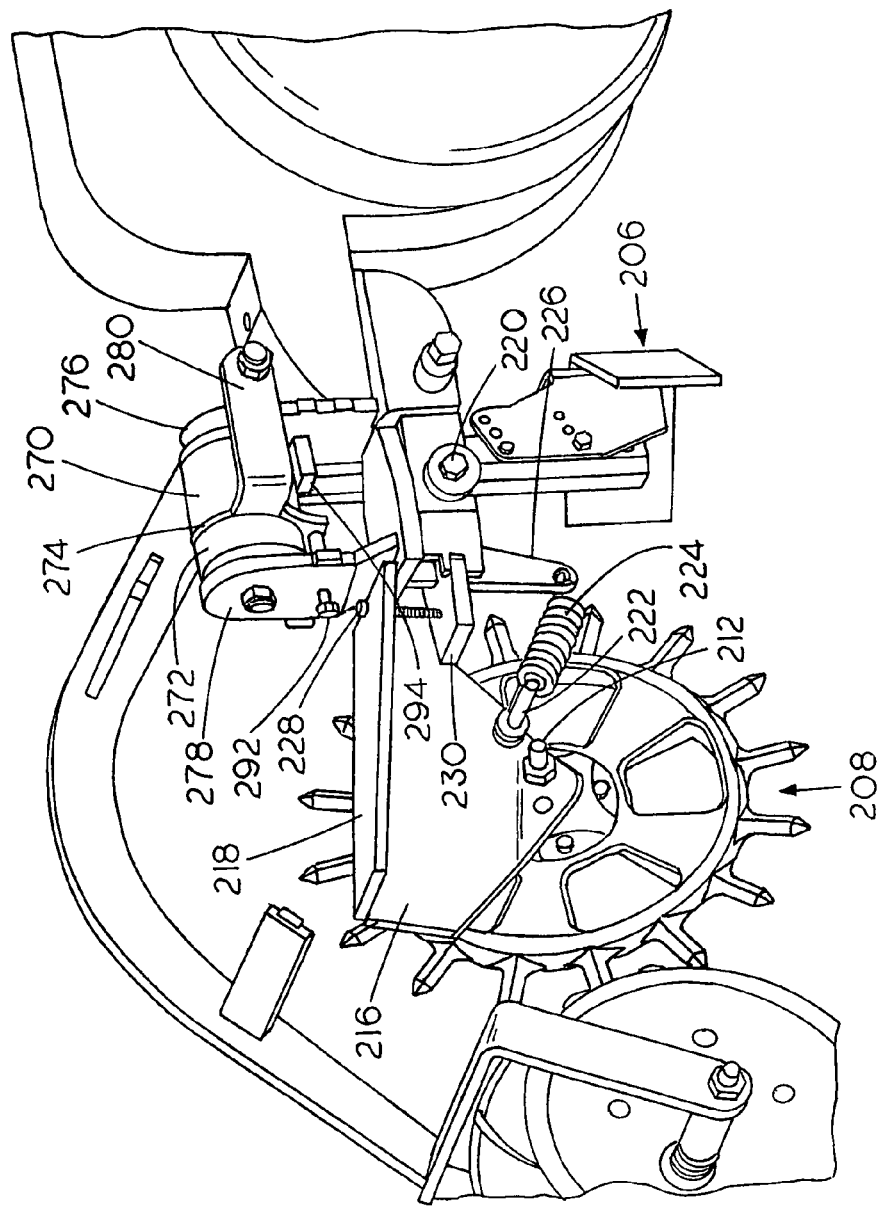
FIG. 8 is a perspective view showing the mechanism of the embodiment of FIGS. 7A and 7B with parts removed for clarity.
Figure 9:
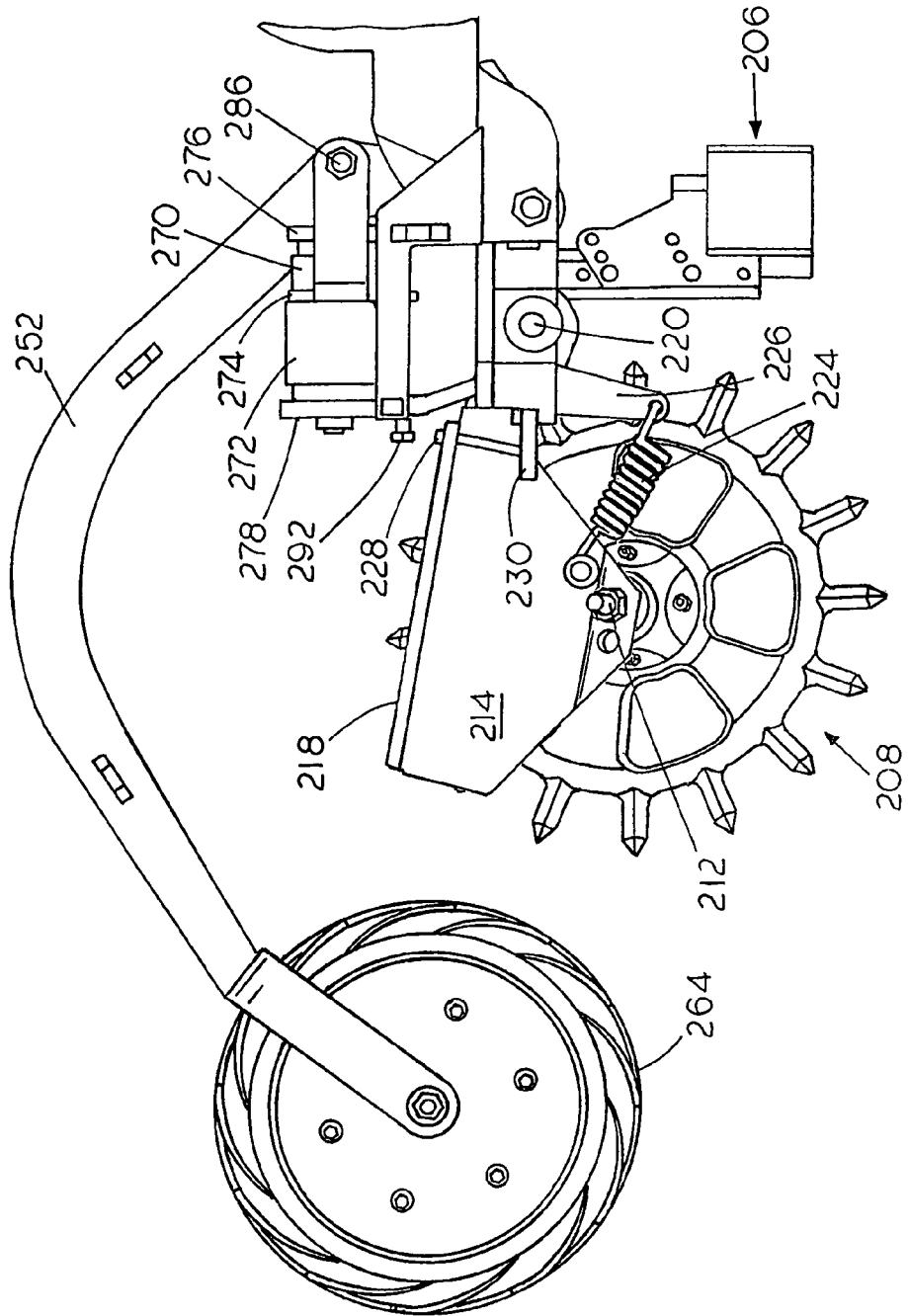
FIG. 9 is a view of the embodiment of FIGS. 7A and 7B shown with both the closing wheels and the packing wheel in a raised position.

The trench closing wheel assembly is similar to the previously described embodiment and includes a pair of converging spiked closing wheels 208, smooth rimmed wheels and/or flat or concave disk members 210 (FIGS. 10A-10C) mounted on axles or shafts 212 which extend through heavy shaped side plate members 214 and 216 connected by heavy top plate member 218. As with the previous embodiment, the side plates are attached to pivot about a fulcrum at 220. As shown in FIG. 8, a shaft 222 extends between the side plates and carries one end of a heavy tension spring 224, the other end of which is connected to a fixed lever 226. As with the previous embodiment, the tension spring 224 provides the down force to pivot the closing wheel assembly downward. Depth adjustment is accomplished using a set screw 228 threaded through to plate 218 and contacting fixed stop member 230.

The packing wheel assembly employs a modified operating system, but is otherwise similar to the first described embodiment. It includes a supporting pivoting packing wheel framework including spaced, generally arcuate support arms 250 and 252 spanned by connecting cross members 254. The arms 250 and 252 are connected at fixed ends to pivot on a pivot arm mounting shaft 256 at 258 and 260, respectively. The packing wheel framework connects at its free end to a yoke 262 which carries packing wheel 264 on an axle 266, which may be a bolt member provided with bushings as at 267 and 268 attached to wheels 264.

The alternative packing wheel assembly is operated by a fixed dual aligned linear airbag system that includes a down-force airbag 270 and a lift force airbag 272 separated by a central traveling intermediate plate 274 that reciprocates linearly between the airbags. The system airbags are further flanked by a fixed down-force plate 276 and a fixed lift-force plate 278. The traveling plate 274 is connected or otherwise integral with a double-acting flange 280 which has a pair of arms 282 and 284 that extend along generally parallel to the aligned airbags and connect to the pivot arms using an upper mounting shaft or stub shafts 286 at 288 and 290.

As best viewed in FIG. 8, a heavy set screw 292 is threaded through the lower portion of the fixed lift force plate 278 to contact a lower extension of the traveling intermediate plate 274, when the down-force bag extends and the lift bag deflates, to limit the rearward travel of the traveling intermediate plate 274 and thereby provide an adjustable stop for downward travel of the packing wheel support arms. Travel in the forward direction is limited by contact between the traveling intermediate plate and a fixed member 294 to thereby provide a positive stop limiting the upward travel of the packing wheel lift arms. As with the previous embodiment, pressure can be supplied to both airbags at the same time to control the net downward force exerted by the packing wheel to accommodate any soil type or condition encountered.

Figure 10A:
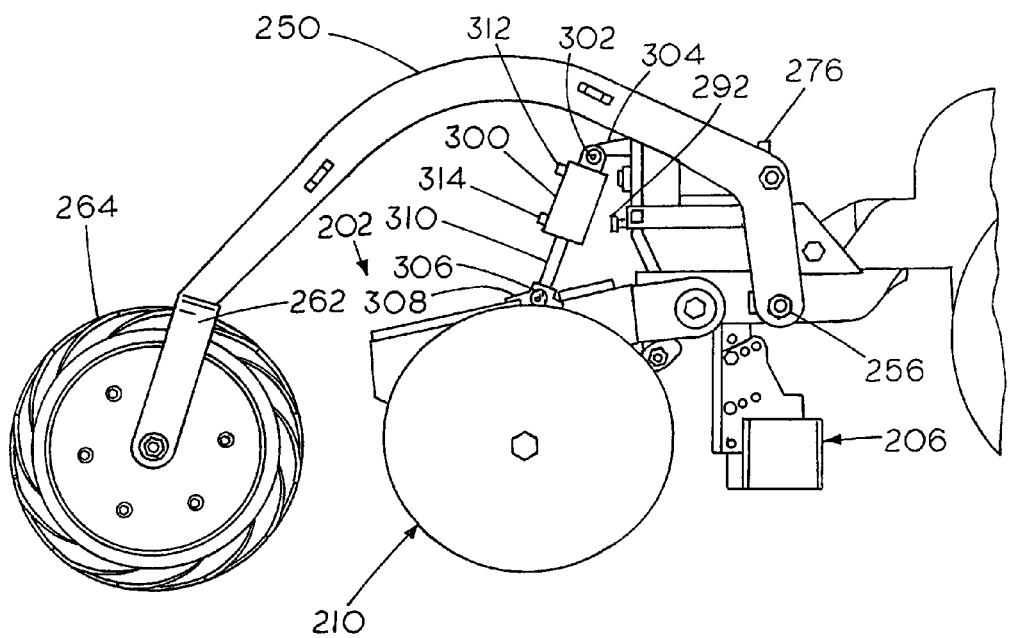
FIG. 10A is a view of the alternate embodiment including smooth closing wheels and a cylinder closing wheel deployment mechanism shown in the deployed or down position.
Figure 10B:
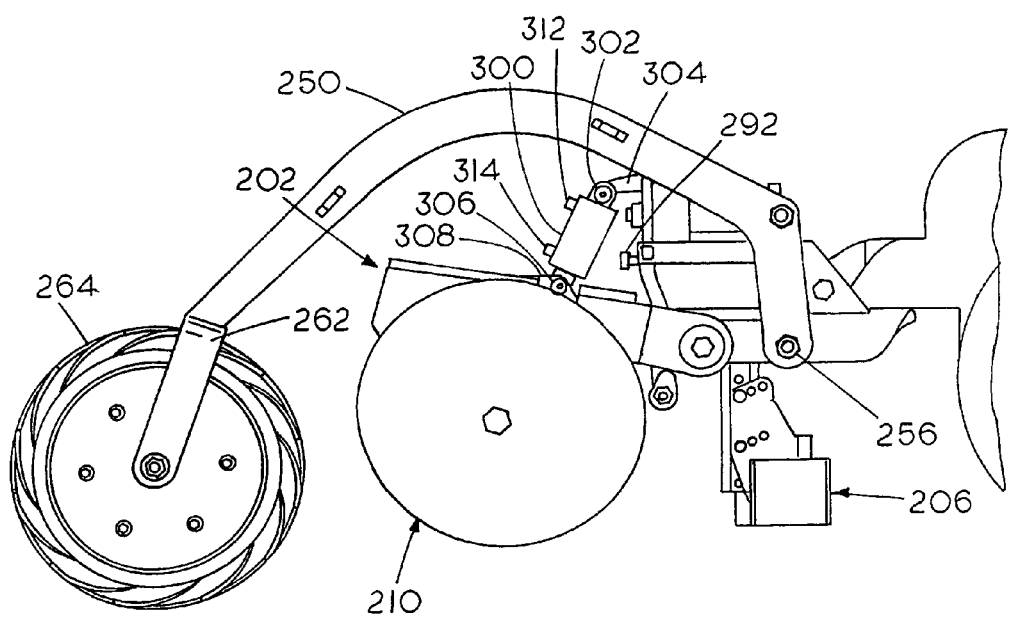
FIG. 10B is a view similar to that of FIG. 10A with the deployment mechanism in the retracted or lifted position.
Figure 10C:
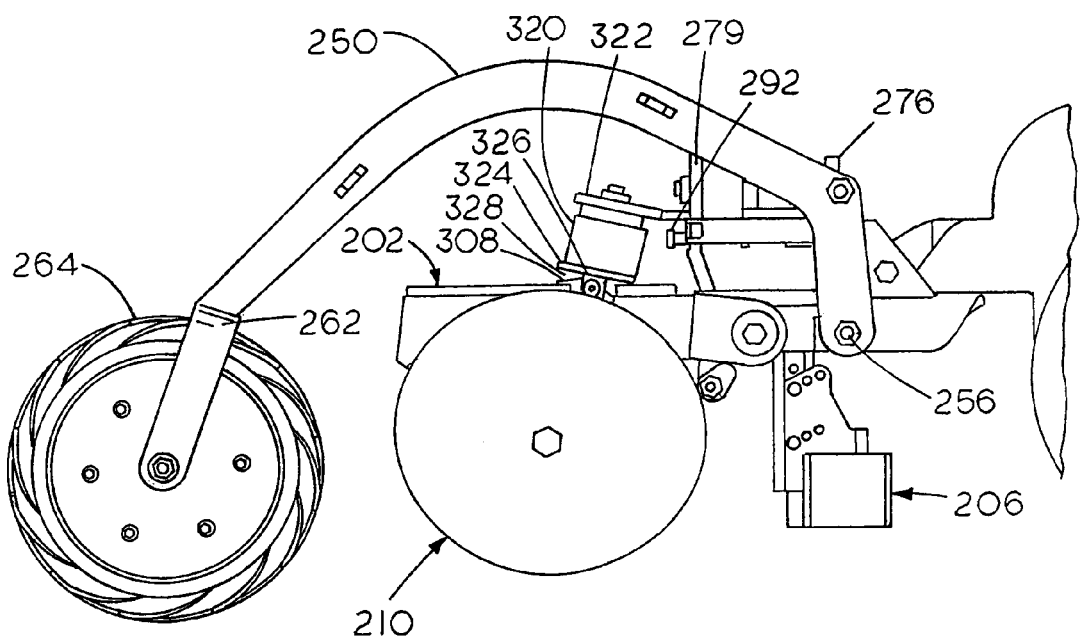
FIG. 10C is a view similar to FIGS. 10A and 10B except that an airbag is used to produce the down force on the closing wheel assembly.

FIGS. 10A-10C illustrate an embodiment similar to that of FIGS. 7A-9 that utilizes alternate types of actuators in the deployment of the closing wheel arrangement. In FIG. 10A, there is shown a double-acting pneumatic cylinder 300 pivotally attached at 302 between a member 304 fixed to lift-force plate 278 and at 306 pivotally attached to a member 308 fixed to the closing wheel assembly 202. The actuator is shown with the rod 310 extended which forces the closing wheels into the down or deployed position. A stop arrangement similar to that of other embodiments can be used to limit vertical travel of the closing wheels 210. Down-force and lift pneumatic connectors are shown at 312 and 314. It will be appreciated that a hydraulic cylinder arrangement could also be used to deploy the closing wheels.

FIG. 10B is a view similar to FIG. 10A showing the closing wheels in the raised or fully retracted position. The packer wheel is shown in a deployed or down position in both FIGS. 10A and 10B.

In FIG. 10C, there is shown a further actuator device for deploying the closing mechanisms in the form of an airbag 320 connected between a fixed member 322 connected between lift-force plate 278 and member 308. The lower plate 324 is fixed to a member 326 pivotally mounted at 328 to the closing mechanism 202. Airbag 320 is shown partially extended in FIG. 10C.

The FIGS. 11A and 11B illustrate a follower angle adjustment system for adjusting the relative angle between the row unit and the main unit to which it is attached. The row unit is shown with the packing wheel assembly removed. The unit is shown hitched pivotally at 400 to a main unit 420. A heavy mounting flange member 402 is provided as part of the fixed mounting assembly of the row unit. Heavy oppositely disposed adjustment bolts 404 and 406 are threaded through the flange 402 behind the pivot joint at 408 and 410. The flange member 402 extends over a shaped member 412 to which the row treating unit is hitched. By adjusting the adjustment bolts in and out, the angle between the row unit and the attachment flange can be slightly varied to move the row treating unit to the left or to the right of dead center, if desired, as shown in the figures.

Figure 12A:
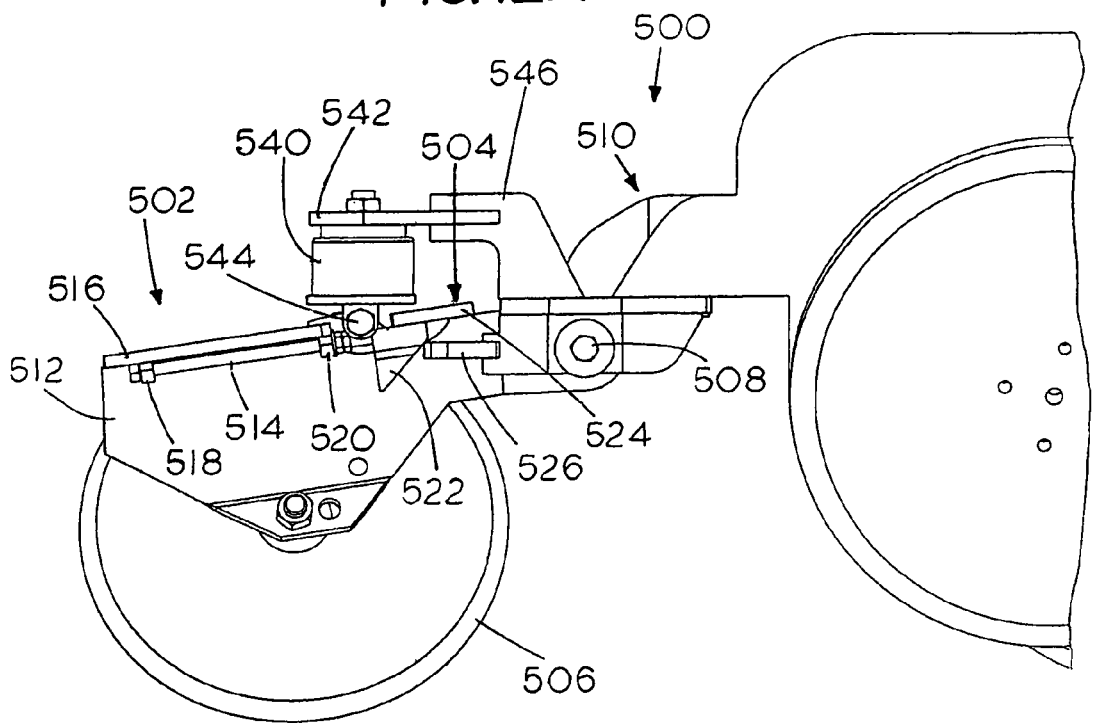
FIG. 12A is a fragmentary side view with parts removed for clarity of a closing wheel arrangement using a pneumatic down-force actuator and movable wedge travel limiting assembly.
Figure 12B:
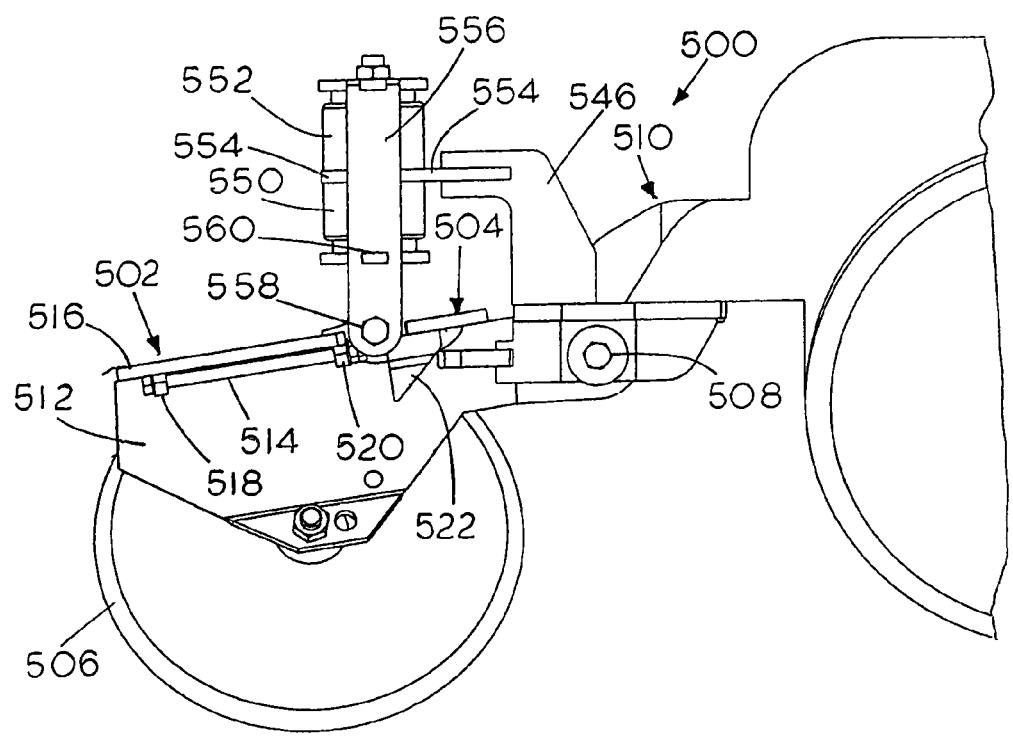
FIG. 12B is a view similar to that of FIG. 12A provided with a dual aligned down-force and lift actuator arrangement

FIGS. 12A and 12B depict another embodiment of a row unit having a closing wheel arrangement shown generally at 500 that includes a pivotally mounted closing wheel assembly 502 and a mounting assembly 504. The closing wheel assembly includes a pair of closing wheels, one of which is shown at 506, carried by a structure pivotally connected at 508 to a fixed mounting structure 510. The closing wheel assembly includes main structural shapes as at 512 and a travel limiting arrangement that includes a bolt member 514 carried by a flange member 516. The bolt 514 is threaded through members 518 and 520. The bolt 514 addresses and adjusts a movable wedge member 522 which, in turn, limits the gap between a top stop plate 524 and a bottom stop plate 526 to determine the vertical travel limit of the wheel 506.

The closing wheel assembly 502 is operated by a down-force only pneumatic arrangement in FIG. 12A. That arrangement uses a down-force airbag 540 mounted between a fixed vertical stop member 542 and is fixed to the pivoting wheel assembly by a pivotal mount at 544. The member 542 is fixed to and carried by a fixed mounting member 546.

In FIG. 12B, the closing wheel assembly 502 is operated by an aligned dual airbag system that includes down-force airbag 550 and lift airbag 552 which operate against a fixed intermediate member 554 to raise and lower a shaped flange arrangement that includes a flange member 556 that is vertically adjustable and attached at 558 to the closing wheel assembly and to the airbag system at 560.

Figure 13B:
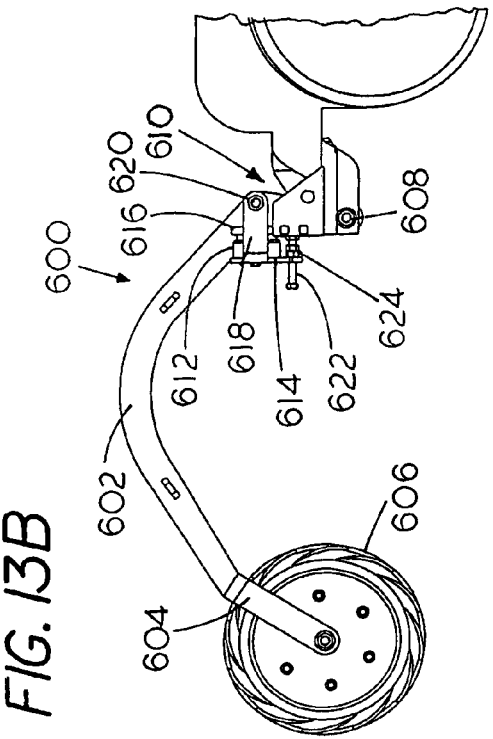
FIGS. 13A and 13B depict side views of an embodiment of a row treating unit employing a packing wheel only with a down-force actuator and adjustable mechanical stop shown in lowered and raised positions, respectively.
Figure 13D:
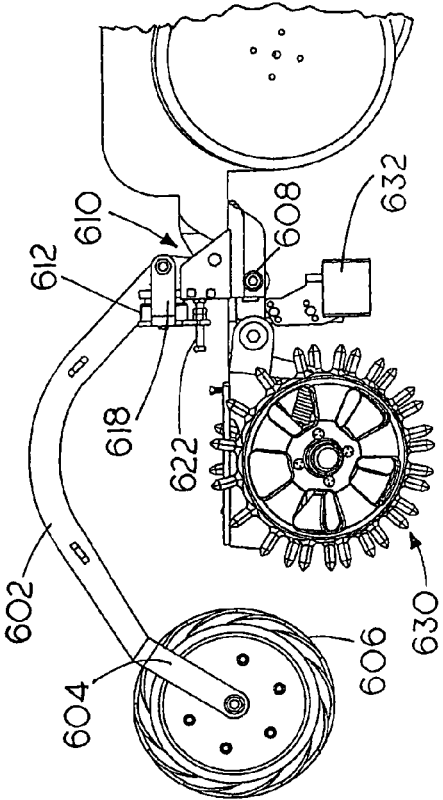
FIGS. 13C and 13D depict side views of an embodiment of a row treating unit in which the packing wheel of FIGS. 13A and 13B is combined with a closing wheel arrangement.
Figure 13A:
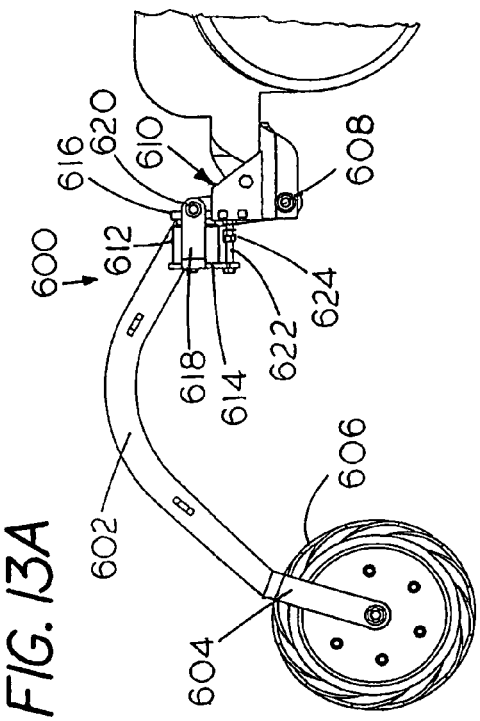

FIGS. 13A and 13B depict another embodiment of a row unit having a packing wheel arrangement that is not combined with a closing wheel system. The row unit shown generally at 600 and includes a pair of spaced curved support arms, one of which is shown at 602, which carry a yoke 604 into which is journaled a packing wheel 606. The arms 602 are mounted to rotate on a pivot joint 608 that is mounted in a fixed attachment structure 610. The packing wheel is operated by a down-force pneumatic operator which operates between a moveable plate member 614 and a fixed plate member 616 to operate a bent flange member 618 that is connected to the arms 602 at a further pivot joint 620. The travel distance allowed the system for the deployment of the packing wheel 606 is controlled and limited by an adjustable bolt or rod member 622.

In FIG. 13A, the pneumatic operator is inflated and the packing wheel is in the fully down or deployed position with member 614 fully extended along member 622. Conversely in FIG. 13B, the pneumatic operator 612 is collapsed or deflated and the member 614 is fully retracted along the member 622 to upward stops 624 and the packing wheel is in the fully raised position.

Figure 13C:
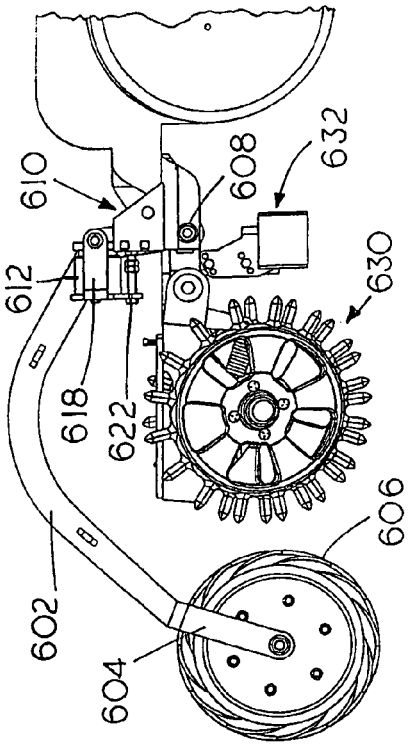

FIGS. 13C and 13D are views of the embodiment of FIGS. 13A and 13B with the addition of a closing wheel assembly 630 in combination with the packing wheel arrangement. A debris deflector is shown at 632.

Figure 17:
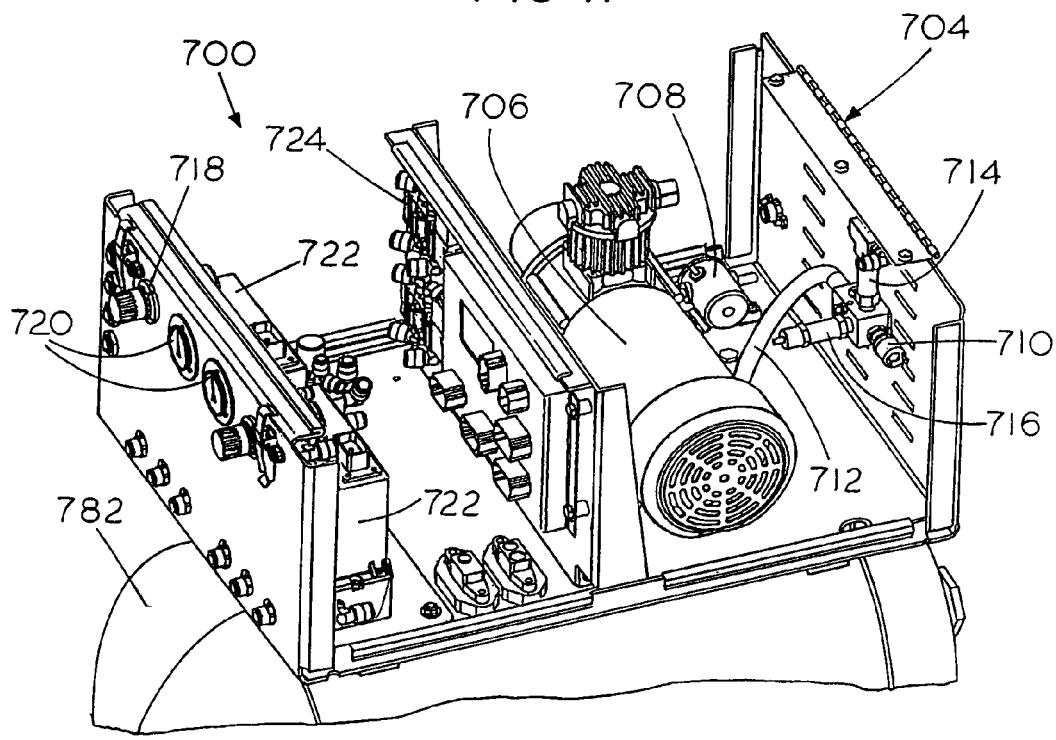
FIG. 17 depicts a pneumatic system that can be used to operate the pneumatic actuators associated with a system employing a number of row units.

In FIG. 17, there is shown a pneumatic system with parts of the enclosure removed to expose certain internal parts. The system, shown generally at 700, includes an accumulator tank, shown partially at 702, which may be sized according to the desired capacity of the system for performing the necessary functions. The accumulator tank is provided with mounting legs (not shown) and is designed to be mounted on a multi-row seeding implement, or the like, in a well-known manner. A control box housing the control devices for the system is shown at 704 with parts removed to expose the interior which houses an air compressor 706, which may be electric or hydraulic. An ignition solenoid is shown at 708 and a pressure switch at 710, which operates to cycle the compressor in a well-known manner, alternatively, the compressor assembly can be controlled from an ISOBUS capable terminal.

The compressor output line is shown at 712 and a check valve is shown at 714 that prevents back flow from the tank 702. A safety pressure relief or pop-off valve is shown at 716 that prevents over pressurization of the system. Control knobs for manually adjusted pressure regulators are shown at 718 and associated output pressure gauges are shown at 720. These are used to regulate output or operating pressure to the elements of the system and their settings may be changed, if necessary, during operation of the implements, but are preferably preset.

Figure 18:
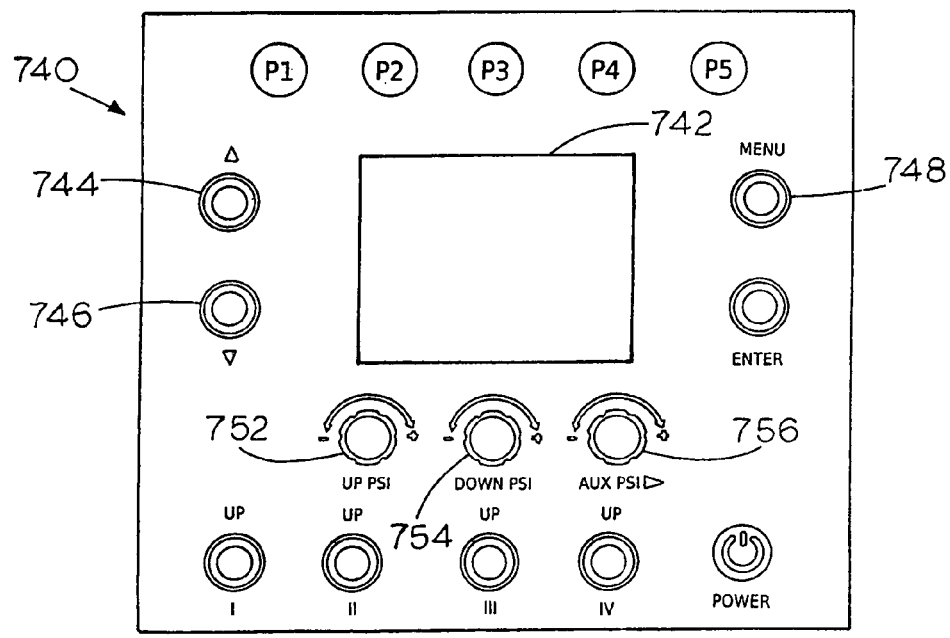
FIG. 18 is a view of a possible cab control panel associated with controlling the operation of one or more row units.

Blocks of electronic pressure regulators as at 722 can be used to regulate up and down pressure applied to pneumatic operators for various devices controlled by the system which may include trash whips (row clearing devices), coulters, rolling baskets, or the like, employed prior to seeding in addition to post-seeding implements. The electronic pressure regulators may be controlled by commands from a control panel, such as shown in FIG. 18. A typical 5-way valve is shown at 724 and more fully described in conjunction with FIGS. 14A and 14B.

FIG. 18 depicts one possible control or switch panel 740 designed to interface between an operator in the cab of a tractor or other prime mover and the pneumatic system. The control is used to send commands to all of the valves and regulators. Thus, buttons P1-P5 represent an array of preset pressures for various regulators. These can be used to fix preferred conditions. The panel also includes a display screen 742, up and down screen scroll buttons 744 and 746. A menu button 748 allows the operator to view all menu screens, fault codes, adjustment of dump valve times, maintenance information, etc. An enter button 750 is associated with the menu screens and may also be used to turn on the pneumatic system.

Controls 752, 754 and 756 are encoders that enable the operator to change the commanded pressure of each of several regulators.

The four buttons on the bottom of the switch panel with the word "UP" above them and numerals one through four below them are the buttons that can be used to actuate dump valves and five port valves 724 (FIG. 17). These buttons are used to switch the different attachments from the down position (with the button turned off) to the "UP" position (with the button turned on).

It will be appreciated that sensors mounted on the row units can transmit data to the cab control system that can also be used to adjust various pressures and/or depth of soil penetration for corresponding implements. Such devices are known.

FIGS. 14A and 14B are schematic representations of a two-position, five-port air valve assembly (as at 724 in FIG. 17) in two alternative positions. The assembly, generally at 770, includes ports 772, 774, 776, 778 and 780 and cylinder 782, housing axially adjustable cylinder valve or plunger 784. The valve body or block is depicted at 786. Ports 772 and 776 are connected to receive air from a high pressure air source. Thus, port 772 is connected to receive compressed air via a manual regulator to provide lift force. Port 776 is connected to receive air via a controlled source to control down force. Ports 778 and 780 connect respectively to a lift force airbag or other pneumatic operator and a down force operator. Finally, port 774 is a vent port for venting air from either the up force operator or the down force operator.

In FIG. 14A, the port receiving high pressure air 772 is connected through the valve block with a lift force operator through outlet port 778 with the central valve plunger 784 shifted down (in the drawing) in cylinder 782 in a first position. With the central cylinder in this position, the corresponding down force operator is connected to the vent port 774 via port 780 so that down force operator is enabled to collapse while the lift force operator inflates. This raises the corresponding implement.

FIG. 14B shows the valve 770 in an alternate position with the central cylinder moved upward (in the drawing). With the plunger in this position, port 776 is connected through the central cylinder to port 780 and port 778 is connected to the central cylinder to vent port 774 and port 772 is deadheaded. With the valve in this position, the source of high pressure air is connected through ports 776 and 780 to the down force operator and the lift force operator is connected to vent through ports 778 and 774. This will enable the down force operator to inflate and the lift force operator to collapse in accordance with moving the corresponding implement to a lowered or deployed position.

FIGS. 15A-15C depict additional pneumatically operated implements that can be used with the pneumatic system of the invention. They include a row clearing or trash whip device 800, in FIG. 15A, with a pair of pneumatic operators, one of which is shown at 802. A rolling basket device, generally 820 in FIG. 15B with pneumatic operators as at 822 and a combination trash whip and coulter device depicted generally at 840 in FIG. 15C with trash whip blades 842 and coulter wheel 844. Pneumatic operators are depicted at 846 and 848.

FIG. 16 is a schematic representation of a multi-row pneumatic system layout that can be controlled by the system of FIGS. 17 and 18. The schematic includes a plurality of central section row units 860 and these are flanked by a plurality of wing section units at 862 and 864. A down-force pressure air line is shown at 866 that supplies down pressure to the center units through a manifold 868 and supplies pressurized downforce air to wing section units 862 and 864 through manifolds 870 and 872, respectively. A common lift pressure system is shown using air line 876 which supplies manifolds 878, 880 and 882. A controlled source is depicted at 884.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A row treating unit for attachment to follow a multi-row agricultural implement comprising:
   (a) a main unit mounting arrangement for carrying the unit and adapted to attach the unit to a main implement, tow bar, or the like;
   (b) a soil trench closing mechanism assembly comprising, optionally, one or a pair of height adjustable closing wheels and a closing wheel mounting arrangement comprising a closing-wheel force-applying device for applying at least a downward force to said closing wheels to force them to firm/pack the soil and an adjustable depth limiting device to limit the depth of soil penetrated by said closing wheels corresponding to a low point of said height adjustment; and
   (c) a packing wheel assembly comprising a packing wheel and a packing wheel mounting arrangement for carrying the packing wheel, said mounting arrangement further comprising a pneumatic operating system that includes aligned down force and lift airbags located between fixed plate members with a traveling intermediate plate member therebetween for lowering said packing wheel and controlling the downward force exerted by the packing wheel on the soil and lifting the packing wheel away from soil contact.

2. A row treating unit as in claim 1 wherein said packing wheel mounting arrangement comprises an independent pivotally mounted framework operated by said pneumatic operating system.

3. A row treating unit as in claim 1 wherein said packing wheel mounting arrangement pivotally mounted framework further comprises spaced pivotally mounted support arms connected to and pivoted by a member reciprocally operated by said traveling intermediate plate of said pneumatic control system.

4. A row treating unit as in claim 3 wherein said pneumatic control system for said packing wheel further comprises mechanical down and lift stop devices to limit down-force and travel of said packing wheel.

5. A row treating unit as in claim 4 wherein said down-force and lift stop devices limit the travel of said traveling intermediate plate.

6. A row treating unit as in claim 5 wherein said down-force stop device of said traveling intermediate plate is adjustable.

7. A row treating unit as in claim 1 wherein said pneumatic operating system for said packing wheel further comprises mechanical down and lift stop devices to limit down-force and travel of said packing wheel.

8. A row treating unit as in claim 7 wherein said down-force stop device is adjustable.

9. A row treating unit as in claim 1 further comprising a lateral follower angle adjustment arrangement for adjusting the lateral follower angle between the row unit and said main unit.

10. A row treating unit as in claim 1 wherein said closing wheels are selected from smooth and spiked-rim wheels, flat or concave disks.

11. A row treating unit as in claim 1 wherein said closing wheel mounting arrangement is pivotally connected to said main unit mounting arrangement.

12. A row treating unit as in claim 11 wherein said force-applying device of said closing wheel mounting arrangement is selected from tension springs, pneumatic, and hydraulic operators.

13. A row treating unit as in claim 12 wherein said force-applying device of said closing wheel mounting arrangement comprises a pneumatic device selected from airbags and pneumatic cylinders.

14. A row treating unit as in claim 1 wherein said depth-limiting device to limit the depth of penetration by said closing wheels is selected from a set screw, wedge, moving wedge, airbag system, pneumatic cylinder, and a hydraulic cylinder.

15. A row treating unit as in claim 14 wherein said depth limiting device to limit the depth of penetration by said closing wheels comprises a manually adjustable set screw or bolt-adjustable moving wedge.

16. A row treating unit as in claim wherein said packing wheel assembly includes an arm arrangement having a pair of spaced pivotally mounted shaped arm members connected to pivot about a common shaft adapted to be pivoted by a linear reciprocating device operated by said aligned down-force and lifting pneumatic operators and wherein said packing wheel assembly includes lift and down position mechanical stops to limit down force and travel of said packing wheel.

17. A row treating unit as in claim 16 wherein said down position mechanical stop for said packing wheel is adjustable.

18. A row treating unit as in claim 1 further comprising a debris deflector mounted ahead of said closing wheels.

19. A row treating unit as in claim 18 wherein the height of said debris deflector is adjustable.

20. A row treating unit as in claim 1 wherein said closing wheel force-applying device further comprises a lifting device to lift said closing wheels above ground.

21. A row treating unit as in claim 20 wherein said closing wheel force-applying device further comprises an aligned airbag system to apply downward force and lift to said closing wheels.

22. A row treating unit as in claim 20 wherein said closing mechanism assembly is operated using a double acting cylinder.

23. A row treating unit as in claim 1 wherein said closing mechanism assembly comprises one closing wheel.

24. A row treating unit for attachment to follow a multi-row agriculture implement comprising:

(a) a main mounting arrangement for carrying the unit adapted to attach the unit to a main implement, tow bar or the like;

(b) a soil trench closing assembly comprising one or more closing wheels and a closing wheel mounting arrangement pivotally connected to said main mounting arrangement that enables height adjustment of said closing wheels and a controlled force applying system that includes an aligned airbag system that applies a downward directed force and lift to said closing wheels, wherein a low point of said height adjustment is fixed by a depth limiting device.

25. A row treating unit as in claim 24 wherein said closing wheels are selected from smooth and spiked-rim wheels, flat or concave disks.

26. A row treating unit as in claim 24 wherein said depth-limiting device to limit the depth of penetration by said closing wheels is selected from a set screw, wedge, moving wedge, airbag system, pneumatic cylinder, and a hydraulic cylinder.

27. A row treating unit as in claim 26 wherein said adjustable depth limiting device is selected from an adjustable bolt and a bolt-adjusted traveling wedge.

28. A row treating unit for attachment to follow a multi-row agricultural implement comprising:

(a) a main unit mounting arrangement for carrying the unit and adapted to attach the unit to a main implement, tow bar, or the like; and (b) a packing wheel assembly comprising a packing wheel and a packing wheel mounting arrangement for carrying the packing wheel, said mounting arrangement further comprising a pivotally mounted framework and a pneumatic control system that includes linearly aligned down-force and lift airbags located between fixed plate members with a traveling intermediate plate member that provide a downward force device for lowering said packing wheel and controlling the downward force exerted by the packing wheel on the soil and a lifting force.

29. A row treating unit as in claim 28 wherein said traveling intermediate plate is connected to operate said pivoting arrangement.

30. A row treating unit as in claim 28 wherein said packing wheel mounting arrangement pivotally mounted framework further comprises spaced pivotally mounted support arms connected to and pivoted by a member reciprocally operated by said traveling intermediate plate of said pneumatic control system.

31. A row treating unit as in claim 28 wherein said pneumatic control system for said packing wheel further comprises mechanical down and lift stop devices to limit down-force and travel of said packing wheel.

32. A row treating unit as in claim 31 wherein said down-force stop device is adjustable.

33. A row treating unit as in claim 31 wherein said down-force and lift stop devices limit the travel of said traveling intermediate plate.

34. A row treating unit as in claim 28 further comprising a lateral follower angle adjustment arrangement for adjusting the lateral follower angle between the row unit and said main unit.

35. A row treating unit for attachment to follow a multi-row agricultural implement comprising:

(a) a main unit mounting arrangement for carrying the unit and adapted to attach the unit to a main implement, tow bar, or the like;

(b) a soil trench closing mechanism assembly comprising, optionally, one or a pair of height adjustable closing wheels and a closing wheel mounting arrangement comprising a closing-wheel force-applying device for applying at least a downward force to said closing wheels to force them to firm/pack the soil and an adjustable depth limiting device to limit the depth of soil penetrated by said closing wheels corresponding to a low point of said height adjustment; and (c) a packing wheel assembly comprising a packing wheel and a packing wheel mounting arrangement for carrying the packing wheel, said mounting arrangement further comprising a pneumatic operating system that includes a down-force airbag and a pair of lift airbags that cooperate to operate a lift pedestal between a lift stop and a downward limit stop thereby lowering said packing wheel and controlling the downward force exerted by the packing wheel on the soil and lifting the packing wheel away from soil contact.

* * * * *